(12) United States Patent
Nelson

(10) Patent No.: US 8,160,574 B1
(45) Date of Patent: Apr. 17, 2012

(54) WIRELESS ARCHITECTURE UTILIZING GEO-REFERENCING

(75) Inventor: Joe Nelson, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 952 days.

(21) Appl. No.: 11/644,758

(22) Filed: Dec. 22, 2006

Related U.S. Application Data

(63) Continuation-in-part of application No. 11/156,215, filed on Jun. 17, 2005, now Pat. No. 7,436,797.

(51) Int. Cl.
    *H04W 24/00* (2009.01)
(52) U.S. Cl. ........... 455/426.2; 455/404.2; 455/456.1; 455/453; 455/501; 455/522; 455/62; 455/63; 455/67.11; 455/115.1; 340/517; 340/521; 340/539.22; 340/539.29
(58) Field of Classification Search .......... 455/404.2, 455/426.2, 456.1, 453, 501, 522, 62, 63.1, 455/67.11, 115.1, 69, 446, 445, 517, 67.1, 455/67.4, 449, 524, 456; 340/517, 521, 539.22, 340/539.29
See application file for complete search history.

(56) References Cited

U.S. PATENT DOCUMENTS

| | | | |
|---|---|---|---|
| 5,566,356 A | 10/1996 | Taketsugu | |
| 5,640,400 A | 6/1997 | Sato et al. | |
| 5,682,476 A | 10/1997 | Tapperson et al. | |
| 5,771,174 A | 6/1998 | Spinner et al. | |
| 5,793,963 A | 8/1998 | Tapperson et al. | |
| 5,796,602 A | 8/1998 | Wellan et al. | |
| 5,960,214 A | 9/1999 | Sharpe, Jr. et al. | |
| 5,973,643 A | 10/1999 | Hawkes et al. | |
| 5,974,320 A | 10/1999 | Ward et al. | |
| 6,091,951 A | 7/2000 | Sturniolo et al. | |
| 6,091,954 A | 7/2000 | Haartsen et al. | |
| 6,199,018 B1 | 3/2001 | Quist et al. | |
| 6,246,320 B1 | 6/2001 | Monroe | |
| 6,286,038 B1 | 9/2001 | Reichmeyer et al. | |
| 6,304,556 B1 * | 10/2001 | Haas | 370/254 |
| 6,490,297 B1 | 12/2002 | Kraml et al. | |
| 6,711,148 B1 * | 3/2004 | Hills | 370/338 |
| 6,728,262 B1 | 4/2004 | Woram | |

(Continued)

FOREIGN PATENT DOCUMENTS

CN   1258991 A   7/2000

(Continued)

OTHER PUBLICATIONS

Search Report for Application No. GB0611940.8, dated Sep. 21, 2006.

(Continued)

*Primary Examiner* — Kwasi Karikari
(74) *Attorney, Agent, or Firm* — Marshall, Gerstein & Borun LLP

(57) ABSTRACT

A wireless communication system for use in a process control environment includes a reference node adapted to determine geographic positions of at least some of the reference node, a base node, and a field node and determine RF power settings of transceivers attached to the reference node, the base node, and the field node based on the position of determined geographic positions. Additionally, the reference node is adapted to determine RF noise level at a plurality of locations within the process control environment at a plurality of times and to adjust the RF power settings based on the determined RF noise levels. The reference node may be implemented on a hand-held device.

24 Claims, 18 Drawing Sheets

U.S. PATENT DOCUMENTS

| | | | |
|---|---|---|---|
| 6,735,448 B1* | 5/2004 | Krishnamurthy et al. | 455/522 |
| 6,748,233 B1* | 6/2004 | Arnold et al. | 455/522 |
| 6,775,707 B1 | 8/2004 | Bennett et al. | |
| 6,826,385 B2 | 11/2004 | Kujala | |
| 6,847,997 B1 | 1/2005 | Kleiner | |
| 6,862,460 B2 | 3/2005 | Safadi | |
| 6,970,183 B1 | 11/2005 | Monroe | |
| 6,970,714 B2* | 11/2005 | D'Souza et al. | 455/522 |
| 6,975,873 B1 | 12/2005 | Banks et al. | |
| 6,985,087 B2* | 1/2006 | Soliman | 340/870.02 |
| 7,019,637 B1* | 3/2006 | Johnson et al. | 340/531 |
| 7,068,605 B2* | 6/2006 | Cain et al. | 370/235 |
| 7,106,703 B1* | 9/2006 | Belcea | 370/310 |
| 7,106,707 B1* | 9/2006 | Strutt | 370/329 |
| 7,184,770 B1* | 2/2007 | Narasimhan et al. | 455/446 |
| 7,251,224 B2* | 7/2007 | Ades et al. | 370/330 |
| 7,283,832 B2 | 10/2007 | Jia et al. | |
| 7,353,023 B1 | 4/2008 | Link, II et al. | |
| 7,436,797 B2 | 10/2008 | Shepard et al. | |
| 7,460,865 B2 | 12/2008 | Nixon et al. | |
| 7,482,929 B2 | 1/2009 | Bowers et al. | |
| 7,496,059 B2* | 2/2009 | Yoon | 370/311 |
| 7,512,079 B2* | 3/2009 | Labrador et al. | 370/254 |
| 7,606,938 B2 | 10/2009 | Roese et al. | |
| 7,708,707 B2 | 5/2010 | Cook et al. | |
| 7,933,594 B2 | 4/2011 | Nixon et al. | |
| 2002/0102995 A1 | 8/2002 | Zelmanovich et al. | |
| 2002/0125998 A1* | 9/2002 | Petite et al. | 340/286.01 |
| 2002/0130846 A1 | 9/2002 | Nixon et al. | |
| 2002/0160771 A1 | 10/2002 | Massie et al. | |
| 2002/0169514 A1 | 11/2002 | Eryurek et al. | |
| 2002/0169977 A1 | 11/2002 | Chmaytelli | |
| 2003/0043052 A1 | 3/2003 | Tapperson et al. | |
| 2003/0054868 A1 | 3/2003 | Paulsen et al. | |
| 2003/0099221 A1 | 5/2003 | Rhee | |
| 2003/0171827 A1 | 9/2003 | Keyes et al. | |
| 2003/0198208 A1 | 10/2003 | Koos, Jr. et al. | |
| 2003/0218996 A1 | 11/2003 | Sumino et al. | |
| 2004/0015609 A1 | 1/2004 | Brown et al. | |
| 2004/0103165 A1 | 5/2004 | Nixon et al. | |
| 2004/0153594 A1 | 8/2004 | Rotvold et al. | |
| 2004/0203355 A1 | 10/2004 | Light et al. | |
| 2004/0203434 A1 | 10/2004 | Karschnia et al. | |
| 2004/0203762 A1* | 10/2004 | Liu et al. | 455/434 |
| 2004/0203863 A1 | 10/2004 | Huomo | |
| 2004/0203897 A1* | 10/2004 | Rogers | 455/456.1 |
| 2004/0203989 A1* | 10/2004 | Karaoguz | 455/522 |
| 2004/0235468 A1* | 11/2004 | Luebke et al. | 455/426.1 |
| 2004/0242216 A1 | 12/2004 | Boutsikakis | |
| 2004/0242275 A1 | 12/2004 | Corbett et al. | |
| 2004/0259533 A1 | 12/2004 | Nixon et al. | |
| 2004/0260405 A1 | 12/2004 | Eddie et al. | |
| 2005/0062677 A1 | 3/2005 | Nixon et al. | |
| 2005/0130605 A1 | 6/2005 | Karschnia et al. | |
| 2005/0276233 A1 | 12/2005 | Shepard et al. | |
| 2006/0077917 A1 | 4/2006 | Brahmajosyula et al. | |
| 2008/0250162 A1 | 10/2008 | Nixon et al. | |
| 2008/0291013 A1 | 11/2008 | McCown et al. | |
| 2009/0097415 A1 | 4/2009 | Shepard et al. | |

FOREIGN PATENT DOCUMENTS

| | | | |
|---|---|---|---|
| CN | 1387324 A | | 12/2002 |
| EP | 0 748 085 | | 12/1996 |
| EP | 0 961 184 A2 | | 12/1999 |
| EP | 1 045 302 | | 10/2000 |
| EP | 1 258 991 | | 11/2002 |
| EP | 1 326 349 A1 | | 7/2003 |
| EP | 1 689 094 | | 8/2006 |
| GB | 2277849 | | 11/1994 |
| GB | 2318252 | | 4/1998 |
| GB | 2345827 | | 7/2000 |
| GB | 2352539 | | 1/2001 |
| GB | 2 403 043 A | | 12/2004 |
| GB | 2 423 443 A | | 8/2006 |
| GB | 2 427 797 A | | 1/2007 |
| GB | 2 464 411 A | | 4/2010 |
| GB | 2 466 740 A | | 7/2010 |
| JP | 2000-092117 A | | 3/2000 |
| JP | 2001-36542 | | 2/2001 |
| JP | 2001-277962 A | | 10/2001 |
| JP | 2002-006941 A | | 1/2002 |
| JP | 2002-044722 A | | 2/2002 |
| JP | 2002-064648 A | | 2/2002 |
| JP | 2002-523928 A | | 7/2002 |
| JP | 2005-050313 A | | 2/2005 |
| JP | 2005-051746 A | | 2/2005 |
| WO | WO-92/11736 | | 7/1992 |
| WO | WO-98/36335 | | 8/1998 |
| WO | WO-01/35190 | | 5/2001 |
| WO | WO-01/90773 | | 11/2001 |
| WO | WO-2004/079919 | | 9/2004 |
| WO | WO-2004/079919 A2 | | 9/2004 |
| WO | WO-2004/109984 | | 12/2004 |

OTHER PUBLICATIONS

Combined search and examination report, The Patent Office, United Kingdom, Oct. 25, 2006. Four sheets.
Great Britain Search Report, Oct. 13, 2004, 3 sheets.
The Patent Office, Examination Report, Sep. 29, 2005. 4 pages.
Examination Report for Application No. GB0922269.6, dated May 13, 2010.
Combined Search and Examination Report under Sections 17 and 18(3) issued in GB0922269.6 application by United Kingdom Patent Office on Sep. 27, 2010.
Combined Search and Examination Report under Sections 17 and 18(3) issued in GB1006300.6 application by United Kingdom Patent Office on Apr. 29, 2010.
Examination Report for Application No. GB0611940.8, dated Feb. 15, 2010.
Examination Report for Application No. GB0611940.8, dated Jul 7, 2009.
Examination Report for Application No. GB0922268.8, dated Feb. 15, 2010.
Examination Reoort for Application No. GB0922269.6, dated Feb. 15, 2010.
First Chinese Office Action for Application No. 200610086707.4, dated Aug. 14, 2009.
Second Chinese Office Action for Application No. 200610086707.4, dated Jun. 29, 2010.
Office Action for U.S. Appl. No. 11/156,215, dated Sep. 24, 2007.
Office Action for U.S. Appl. No. 12/250,410, dated Jan. 12, 2010.
Office Action for U.S. Appl. No. 12/250,410, dated May 6, 2010.
Product Description: JTS (retrieved Apr. 7, 2010). Available at: http://www.acugen.com/jts.htm.
ZigBee Wireless Networking Systems—Ember (retrieved Apr. 7, 2010). Available at: http://www.ember.com.
Search Report under Section 17 for Application No. GB0724804.0, dated Apr. 21, 2008.
Chinese Rejection Decision for Application No. 2004100794746, dated Oct. 29, 2008.
Combined Search and Examination Report for Application No. GB0922268.8, dated Feb. 15, 2010.
Combined Search and Examination Report for Application No. GB0922269.6, dated Feb. 15, 2010.
Combined Search and Examination Report for Application No. GB1107853.2, dated Jun. 27, 2011.
Decision of Rejection for Japanese Application No. 2004-179085, dated Nov. 16, 2010.
Examination Report for Application No. GB0616898.3, dated Jun. 13, 2007.
Examination Report for Application No. GB0724804.0, dated Jan. 12, 2011.
First Chinese Office Action for Application No. 2004100794746, dated Aug. 24, 2007.
First Chinese Office Action for Application No. 200710301629.X, dated Dec. 22, 2010.
Notice of Reasons for Rejection for Japanese Application No. 2006-168850, dated Jun. 9, 2011.
Notice of Reasons of Rejection for Japanese Application No. 2004-179085, dated Feb. 23, 2010.

Search Report for Application No. GB0724804.0, dated Apr. 21, 2008.
Second Office Action for Chinese Application No. 2004100794746, dated May 9, 2008.
Reexamination Notification for Chinese Application No. 2004100794746, dated Nov. 6, 2009.
Restriction Requirement for U.S. Appl. No. 10/464,087, dated May 25, 2005.
Office Action for U.S. Appl. No. 10/464,087, dated Nov. 1, 2005.
Office Action for U.S. Appl. No. 10/464,087, dated Jun. 9, 2006.
Office Action for U.S. Appl. No. 10/464,087, dated Nov. 6, 2006.
Office Action for U.S. Appl. No. 12/140,571, dated Jul. 6, 2010.
Office Action for U.S. Appl. No. 12/140,571, dated Dec. 3, 2009.
Office Action for U.S. Appl. No. 12/250,410, dated Feb. 4, 2011.
U.S. Appl. No. 12/250,410, filed Oct. 13, 2008.

* cited by examiner

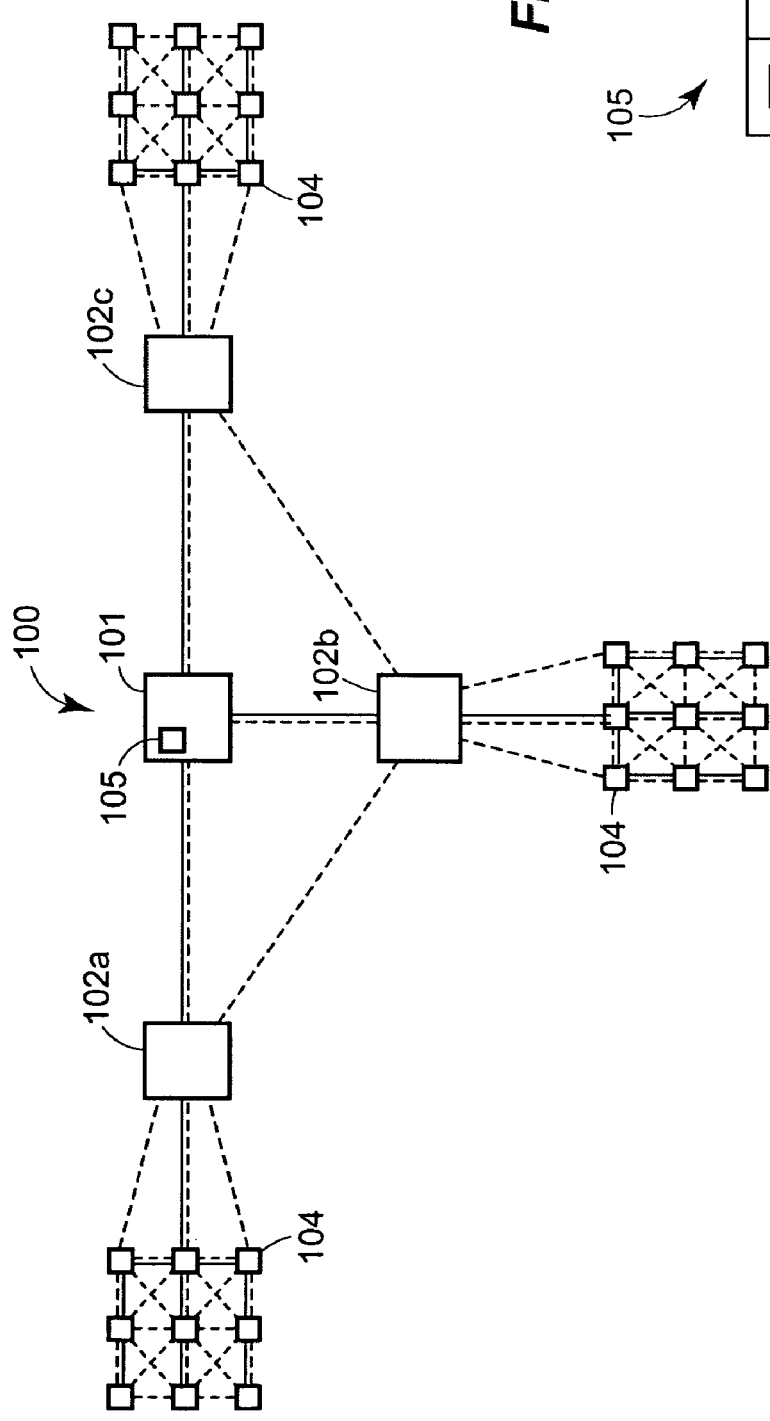
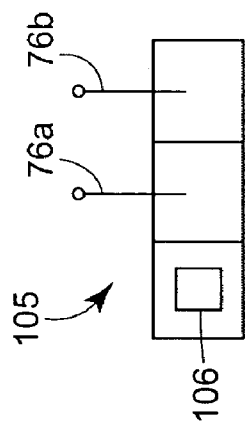
FIG. 3
FIG. 4

Wireless TOPOLOGY had 9 nodes

| BA | : | 03 | 04 | 05 | 07 | 08 | 09 | OA | OB |
|----|---|----|----|----|----|----|----|----|----|
| 03 | : | 04 | BA | 05 | 07 | 08 | 09 | OA | OB |
| 04 | : | BA | 05 | (07) | 08 | (09) | OA | OB | 03 |
| 05 | : | 07 | 08 | 09 | (OA) | (OB) | BA | 03 | 04 |
| 07 | : | (04) | (05) | (08) | 09 | OA | OB | BA | 03 |
| 08 | : | 09 | OA | OB | BA | 03 | 04 | 07 | 05 |
| 09 | : | OA | OB | BA | 03 | 04 | 07 | 05 | 08 |
| OA | : | OB | BA | (03) | 04 | 07 | (05) | (08) | 09 |
| OB | : | BA | 03 | 04 | 07 | 08 | 09 | OA | |

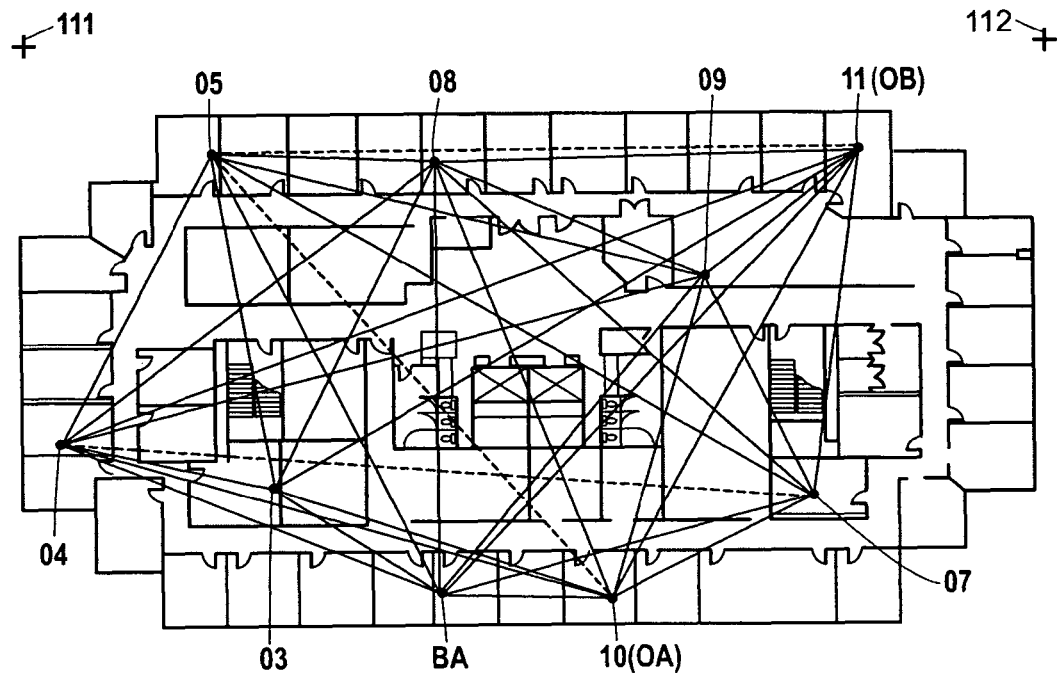

FIG. 14

DISTANCE BETWEEN NODES IN FEET

| | BA | 1 | 2 | 3 | 4 | 5 | 6 | 8 | 9 | 11 | 12 |
|---|---|---|---|---|---|---|---|---|---|---|---|
| BA | 0 | 103 | 137 | 319 | 397 | 403 | 1052 | 322 | 67 | 597 | 295 |
| 1 | 103 | 0 | 238 | 389 | 462 | 457 | 965 | 332 | 84 | 522 | 347 |
| 2 | 137 | 238 | 0 | 238 | 317 | 391 | 1182 | 334 | 176 | 719 | 248 |
| 3 | 319 | 389 | 238 | 0 | 80 | 621 | 1351 | 220 | 305 | 910 | 79 |
| 4 | 397 | 462 | 317 | 80 | 0 | 696 | 1419 | 240 | 378 | 984 | 122 |
| 5 | 403 | 457 | 391 | 621 | 696 | 0 | 1095 | 712 | 470 | 633 | 640 |
| 6 | 1052 | 965 | 1182 | 1351 | 1419 | 1095 | 0 | 1231 | 1048 | 474 | 1299 |
| 8 | 322 | 332 | 334 | 220 | 240 | 712 | 1231 | 0 | 267 | 828 | 142 |
| 9 | 67 | 84 | 176 | 305 | 378 | 470 | 1048 | 267 | 0 | 605 | 265 |
| 10 | 597 | 522 | 719 | 910 | 984 | 633 | 474 | 828 | 605 | 0 | 868 |
| 11 | 295 | 347 | 248 | 79 | 122 | 640 | 1299 | 142 | 265 | 868 | 0 |

FIG. 17

TOPOLOGY COST MATRIX

| | BA | 01 | 02 | 03 | 04 | 05 | 08 | 09 | 12 |
|---|---|---|---|---|---|---|---|---|---|
| BA | : | 1 | 2 | 16 | 16 | 8 | 4 | 1 | 16 |
| 01 | 1 | : | 1 | 1 | ③ | 8 | 2 | 1 | 2 |
| 02 | 2 | 1 | : | ③ | 4 | 7 | 1 | 1 | 2 |
| 03 | 2 | 1 | 1 | : | 2 | 7 | 1 | 1 | 2 |
| 04 | ③ | ③ | 2 | 1 | : | 9 | ③ | 2 | 1 |
| 05 | 8 | 7 | 7 | 9 | 10 | : | 10 | ③ | 2 |
| 08 | 2 | 1 | 1 | ③ | 4 | 2 | : | 1 | 2 |
| 09 | 1 | 1 | 1 | 2 | ③ | 1 | ③ | : | 1 |
| 12 | 2 | 2 | 2 | 1 | 2 | 2 | 4 | 1 | : |

TABLE LEGEND

- ☐ Poor or no Comms
- : Not valid
- ⊡ 3 to 6 Hops
- ⊡ 2 Hops
- n Direct - Weak
- ⊙ Direct - Strong
- x No Connection
- 10 Total nodes used
- 10 Worse Case hops

FIG. 20

| Node/Time | 0000 - 0529 602a | 0530 - 0629 602b | 0630-0829 602c | 0830 - 1129 602d | 1130 - 1300 602e | 1301 - 1729 602f | 1730 - 1929 602g | 1930 - 2359 602h |
|---|---|---|---|---|---|---|---|---|
| BA | 40 | 60 | 55 | 55 | 50 | 50 | 50 | 40 |
| 01 | 40 | 40 | 40 | 55 | 40 | 40 | 40 | 40 |
| 02 | 40 | 40 | 40 | 55 | 40 | 40 | 40 | 40 |
| 03 | 40 | 40 | 55 | 55 | 50 | 50 | 50 | 40 |
| 04 | 40 | 60 | 40 | 55 | 40 | 40 | 40 | 40 |
| 05 | 40 | 40 | 40 | 55 | 40 | 40 | 40 | 40 |
| 08 | 40 | 40 | 40 | 55 | 40 | 40 | 40 | 40 |
| 09 | 40 | 40 | 55 | 55 | 55 | 55 | 40 | 40 |
| 12 | 40 | 40 | — | — | — | — | — | — |

| Node/Time | BA | 01 | 02 | 03 | 04 | 05 | 08 | 09 | 12 |
|---|---|---|---|---|---|---|---|---|---|
| BA | — | 01 | 02 | 03 | 04 | 04 | 08 | 09 | 12 |
| 01 | BA | — | 02 | 03 | 04 | 04 | 08 | 09 | 12 |
| 02 | BA | 01 | — | 03 | 04 | 05 | 08 | 09 | 12 |
| 03 | BA | 01 | 02 | — | 04 | 05 | 08 | 09 | 12 |
| 04 | BA | 01 | 02 | 03 | — | 05 | 05 | 09 | 12 |
| 05 | BA | 01 | 02 | 03 | 04 | — | 08 | 09 | 12 |
| 08 | BA | 01 | 02 | 03 | 04 | 05 | — | BA | 12 |
| 09 | BA | 01 | 02 | 03 | 04 | 05 | 08 | — | 12 |
| 12 | BA | 01 | 01 | 04 | 04 | 05 | 08 | 09 | — |

FIG. 22

| Node/Time | BA | 01 | 02 | 03 | 04 | 05 | 08 | 09 | 12 |
|---|---|---|---|---|---|---|---|---|---|
| BA | — | 01 | 02 | 03 | 04 | 04 | 08 | 09 | 12 |
| 01 | BA | — | 02 | 03 | 04 | 04 | 08 | 09 | 12 |
| 02 | BA | 01 | — | 03 | 04 | 05 | 08 | 09 | 12 |
| 03 | BA | 01 | 02 | — | 04 | 05 | 08 | 09 | 12 |
| 04 | BA | 01 | 02 | 03 | — | 05 | 03 | 09 | 12 |
| 05 | BA | 01 | 02 | 03 | 04 | — | 08 | 09 | 12 |
| 08 | BA | 01 | 02 | 03 | 04 | 05 | — | BA | 12 |
| 09 | BA | 01 | 02 | 03 | 04 | 05 | 08 | — | 12 |
| 12 | BA | 01 | BA | 05 | 04 | 05 | 08 | 09 | — |

WIRELESS ARCHITECTURE UTILIZING GEO-REFERENCING

CROSS REFERENCE TO RELATED APPLICATIONS

This application is a continuation-in-part of U.S. patent application Ser. No. 11/156,215, filed Jun. 17, 2005 and entitled "Wireless Architecture and Support for Process Control Systems," now U.S. Pat. No. 7,436,797 (which is hereby expressly incorporated by reference herein). This application is also related to U.S. patent application Ser. No. 10/464,087, filed Jun. 18, 2003 and entitled "Self-Configuring Communication Networks for use with Process Control Systems," now U.S. Pat. No. 7,460,865 (which is hereby expressly incorporated by reference herein).

FIELD OF TECHNOLOGY

Methods and apparatuses are disclosed for providing wireless communications within a distributed process control system which establish and maintain consistent wireless communication connections between different remote devices and a base computer in a process control system.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

The manner in which process control systems are implemented has evolved over the years. Older generations of process control systems were typically implemented using dedicated, centralized hardware and hard-wired connections.

However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital data buses. In addition to smart field devices, modern process control systems may also include analog field devices such as, for example, 4-20 milliamp (mA) devices, 0-10 volts direct current (VDC) devices, etc., which are typically directly coupled to controllers as opposed to a shared digital data bus or the like.

In a typical industrial or process plant, a distributed control system (DCS) is used to control many of the industrial processes performed at the plant. The plant may have a centralized control room having a computer system with user input/output (I/O), a disc I/O, and other peripherals known in the computing art with one or more process controllers and process I/O subsystems communicatively connected to the centralized control room. Additionally, one or more field devices are typically connected to the I/O subsystems and to the process controllers to implement control and measurement activities within the plant. While the process I/O subsystem may include a plurality of I/O ports connected to the various field devices throughout the plant, the field devices may include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, indicator lights or any other device typically used in process plants.

As used herein, the term "field device" encompasses these devices, as well as any other device that performs a function in a control system. In any event, field devices may include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices.

Traditionally, analog field devices have been connected to the controller by two-wire twisted pair current loops, with each device connected to the controller by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 mA running through the loop. An analog field device that transmits a signal to the control room modulates the current running through the current loop, with the current being proportional to the sensed process variable.

An analog field device that performs an action under control of the control room is controlled by the magnitude of the current through the loop, which current is modulated by the I/O port of the process I/O system, which in turn is controlled by the controller. Traditional two-wire analog devices having active electronics can also receive up to 40 milliwatts of power from the loop. Analog field devices requiring more power are typically connected to the controller using four wires, with two of the wires delivering power to the device. Such devices are known in the art as four-wire devices and are not power limited, as typically are two-wire devices.

A discrete field device can transmit or respond to a binary signal. Typically, discrete field devices operate with a 24 volt signal (either AC or DC), a 110 or 240 volt AC signal, or a 5 volt DC signal. Of course, a discrete device may be designed to operate in accordance with any electrical specification required by a particular control environment. A discrete input field device is simply a switch which either makes or breaks the connection to the controller, while a discrete output field device will take an action based on the presence or absence of a signal from the controller.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve somewhere between a fully open and a fully closed position based on the magnitude of the current flowing through the two-wire twisted pair.

More, recently, field devices that are part of hybrid systems become available that superimpose digital data on the current loop used to transmit analog signals. One such hybrid system is known in the control art as the Highway Addressable Remote Transducer (HART) protocol. The HART system uses the magnitude of the current in the current loop to send an analog control signal or to receive a sensed process variable (as in the traditional system), but also superimposes a digital carrier signal upon the current loop signal. The HART protocol makes use of the Bell 202 Frequency Shift Keying (FSK) standard to superimpose the digital signals at a low level on top of the 4-20 mA analog signals. This enables two-way field communication to take place and makes it possible for additional information beyond just the normal process variable to be communicated to/from a smart field instrument. The HART protocol communicates at 1200 bps without interrupting the 4-20 mA signal and allows a host application (master) to get two or more digital updates per second from a field device. As the digital FSK signal is phase continuous, there is no interference with the 4-20 mA signal.

The FSK signal is relatively slow and can therefore provide updates of a secondary process variable or other parameter at a rate of approximately 2-3 updates per second. Generally, the digital carrier signal is used to send secondary and diagnostic information and is not used to realize the primary control function of the field device. Examples of information provided over the digital carrier signal include secondary process variables, diagnostic information (including sensor diagnostics, device diagnostics, wiring diagnostics, and process diagnostics), operating temperatures, a sensor temperature, calibration information, device ID numbers, materials of construction, configuration or programming information, etc. Accordingly, a single hybrid field device may have a variety of input and output variables and may implement a variety of functions.

More recently, a newer control protocol has been defined by the Instrument Society of America (ISA). The new protocol is generally referred to as Fieldbus, and is specifically referred to as SP50, which is as acronym for Standards and Practice Subcommittee 50. The Fieldbus protocol defines two subprotocols. An H1 Fieldbus network transmits data at a rate up to 31.25 kilobits per second and provides power to field devices coupled to the network. An H2 Fieldbus network transmits data at a rate up to 2.5 megabits per second, does not provide power to field devices connected to the network, and is provided with redundant transmission media. Fieldbus is a nonproprietary open standard and is now prevalent in the industry and, as such, many types of Fieldbus devices have been developed and are in use in process plants. Because Fieldbus devices are used in addition to other types of field devices, such as HART and 4-20 mA devices, a separate support and I/O communication structure is associated with each of these different types of devices.

Newer smart field devices, which are typically all digital in nature, have maintenance modes and enhanced functions that are not accessible from or compatible with older control systems. Even when all components of a distributed control system adhere to the same standard (such as the Fieldbus standard), one manufacturer's control equipment may not be able to access the secondary functions or secondary information provided by another manufacturer's field devices.

Thus, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures, the environment and/or people, etc.

In order to minimize the effect of environmental factors and to assure a consistent communication path, I/O communication networks used in process control systems have historically been hardwired networks, with the wires being encased in environmentally protected materials such as insulation, shielding and conduit. Also, the field devices within these process control systems have typically been communicatively coupled to controllers, workstations, and other process control system components using a hardwired hierarchical topology in which non-smart field devices are directly coupled to controllers using analog interfaces such as, for example, 4-20 mA, 0-10 VDC, etc. hardwired interfaces or I/O boards. Smart field devices, such as Fieldbus devices, are also coupled via hardwired digital data busses, which are coupled to controllers via smart field device interfaces.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area, for example, an oil refinery or chemical plant that consumes several acres of land. In many instances, the wiring associated with the I/O communication network must span long distances and/or go through, under or around many structures (e.g., walls, buildings, equipment, etc.) Such long wiring runs typically involve substantial amounts of labor, material and expense. Further, such long wiring runs are especially susceptible to signal degradation due to wiring impedances and coupled electrical interference, both of which can result in unreliable communications.

Moreover, such hardwired I/O communication networks are generally difficult to reconfigure when modifications or updates are needed. Adding a new field device typically requires the installation of wires between the new field device and a controller. Retrofitting a process plant in this manner may be very difficult and expensive due to the long wiring runs and space constraints that are often found in older process control plants and/or systems. High wire counts within conduits, equipment and/or structures interposing along available wiring paths, etc., may significantly increase the difficulty associated with retrofitting or adding field devices to an existing system. Exchanging an existing field device with a new device having different field wiring requirements may present the same difficulties in the case where more and/or different wires have to be installed to accommodate the new device. Such modifications may often result in significant plant downtime.

It has been suggested to use wireless I/O communication networks to alleviate some of the difficulties associated with hardwired I/O networks. For example, Tapperson et al., U.S. patent application Ser. No. 09/805,124 discloses a system which provides wireless communications between controllers and field devices to augment or supplement the use of hardwired communications. However, most, if not all, wireless I/O communication networks actually implemented within process plants today are implemented using relatively expensive hardware devices (e.g., wireless enabled routers, hubs, switches, etc.), most of which consume a relatively large amount of power. Further, intermittent interferences, such as the passing of trucks, trains, environmental or weather related conditions, etc., make wireless communication networks unreliable and therefore problematic.

In addition, known wireless I/O communication networks, including the hardware and software associated therewith, generally use point-to-point communication paths that are carefully selected during installation and fixed during subsequent operation of the system. Establishing fixed communication paths within these wireless I/O communication networks typically involves the use of one or more experts to perform an expensive site survey that enables the experts to determine the types and/or locations of the transceivers and other communication equipment. Further, once the fixed point-to-point communication paths have been selected via the site survey results, one or more of the experts must then configure equipment, tune antennas, etc. While the point-to-point paths are generally selected to insure adequate wireless communications, changes within the plant, such as the removal or addition of equipment, walls, or other structures may make the initially selected paths less reliable, leading to unreliable wireless communications.

While wireless I/O communication networks can, for example, alleviate the long term robustness issues associated with hardwired communication paths, these wireless I/O communication networks are relatively inflexible and are considered by most in the process control industry to be too unreliable to perform important or necessary process control functions. For example, there is currently no easy manner of telling when a wireless communication is no longer functioning properly, or has degraded to the point that communications over the wireless link are likely to be unreliable or to cease altogether. As a result, current process control operators have very little faith in wireless communication networks when implemented for important and necessary process control functions.

Thus, due to the costs associated with installing a wireless I/O communication network (e.g., site surveys, expert configuration, etc.), and the relatively little amount of faith that current process control system operators have in wireless communications, wireless I/O communication networks are often cost prohibitive for what they provide, particularly for relatively large process control systems such as those typically used in industrial applications.

SUMMARY OF THE DISCLOSURE

A wireless communication architecture for use in a process control system is disclosed which includes the use of mesh and possibly a combination of mesh and point-to-point communications to produce a more robust wireless communication network that can be easily set up, configured, changed and monitored, to thereby make the wireless communication network more robust, less expensive and more reliable. The wireless communication architecture is implemented in a manner that is independent of the specific messages or virtual communication paths within the process plant and, in fact, the wireless communication network is implemented to allow virtual communication paths to be established and used within the process control system in a manner that is independent of the manner in which the wireless signals are sent between different wireless transmitting and receiving devices within the process plant.

In a refinement, one or more environmental nodes are used to control and optimize the operation of the wireless communication network. The environmental node(s) are linked to field "environmental" devices providing signals indicative of one or more environmental factors such as temperature, barometric pressure, humidity, rainfall and radio frequency (RF) ambient noise, amongst other environmental factors that could alter the operation of the network.

In another refinement, the network includes a main controller linked to a wireless card. The wireless card is in communication with an optical repeater node which, in turn, is in communication with a field node. The field node is linked to a plurality of field devices. In another refinement, the repeater node is eliminated. In another refinement, an environmental node and environmental detection devices as discussed above are incorporated with or without one or more repeater nodes. In a further refinement, the field and environmental nodes include a plurality of ports for communication with the field devices.

In a refinement, the wireless communication network is set up to transmit HART communication signals between different devices within the process plant to thereby enable a robust wireless communication network to be used in a process plant or any other environment having HART capable devices.

In an embodiment, a process control wireless communication network is disclosed which comprises a base node, a field node, an environmental node and a host. The base node is communicatively coupled to the host. The base, field and environmental nodes each comprise a wireless conversion unit and a wireless transceiver. The wireless transceivers of the base, the field and environmental nodes effect wireless communication among the base, field and environmental nodes. The field node comprises at least one field device providing process controlled data. The environmental node comprises at least one field device providing data regarding environmental factors that may affect operation of the wireless communication network.

In a refinement, the network also comprises a repeater node comprising a wireless conversion unit in a wireless transceiver. The repeater node effects wireless communications amongst the base, field and environmental node.

In another refinement, the environmental node comprises a plurality of field devices, each providing data selected from the group consisting of temperature, barometric pressure, humidity, rainfall and radio frequency ambient noise.

In another refinement, at least some of the field devices are HART protocol devices. In another refinement, at least some of the field devices are FIELDBUS™ protocol devices.

In another refinement, the network comprises a plurality of environmental nodes strategically placed about a process area for communicating environmental data for different locations within the process area.

In a refinement, the base, environmental and field nodes form a mesh communications network, providing multiple communication pathway options between any two wireless nodes. In another refinement, the base, environmental and field nodes form a point-to-point communications network. In yet another refinement, the network comprises a switch device to convert the base, environmental and field nodes from a mesh communications network to a point-to-point communications network and vice versa.

Communication tools are also disclosed to enable an operator to view a graphic of the wireless communication system to easily determine the actual wireless communication paths established within a process plant, to determine the strength of any particular path and to determine or view the ability of signals to propagate through the wireless communication network from a sender to a receiver to thereby enable a user or operator to assess the overall operational capabilities of the wireless communication network.

In a refinement, the communication tools include one or more of graphical topology maps illustrating connectivity between nodes, tabular presentations showing the connectivity matrix and hop counts and actual maps showing location and connectivity of the hardware devices. The monitor that illustrates wireless communications between the base, field and environmental nodes of the network may be associated with the base node or the host. In another refinement, the topology screen display also illustrates structural features of the process area or environment in which the base, field and environmental nodes are disposed. In another refinement, the host is programmed to provide a tabular screen display listing hop counts for communications between the various nodes of the network.

In another refinement, the wireless communication network is configured to transmit Fieldbus communication signals between different devices within the process plant to thereby enable a robust wireless communication network to be used in a process plant or environment having Fieldbus capable devices in combination with or instead of HART capable devices.

In a refinement, a method for controlling a process is disclosed which comprises receiving field data from at least one field device, transmitting the field data wirelessly from a field node to a base node, converting the field data to a different protocol, transmitting the field data of the different protocol to a routing node, determining at the routing node an object device for receiving the field data of the different protocol, and sending the field data of the different protocol to the object device.

In another refinement, a method for monitoring a wireless process control network is disclosed which comprises receiving environmental data from one or more environmental field devices of an environmental node, wirelessly transmitting the environmental data to a base node, transmitting the environmental data to a host, interpreting the environmental data at the host, sending a command from the host to the base node to adjust at least one operating parameter of the wireless network based upon the environmental data, and transmitting the command from the base node to at least one field node comprising at least one field device for executing the command.

In another refinement, a wireless communication network comprises a base node, a field node, a reference node and a host. The base node is communicatively coupled to the host. The base, field and reference nodes each comprise a wireless conversion unit and a wireless transceiver. The wireless transceivers of the base, the field and the reference nodes effect wireless communications amongst the base, field and reference nodes. The field node comprises at least one field device providing process control data. The reference node comprises a geographical positioning apparatus adapted to determine geographical position of the reference node. The reference node also comprises a RF power settings apparatus located on at least one of the base and reference nodes. The RF power setting apparatus is adapted to: determine the geographic position of each of the base and field nodes relative to the reference node, and determine RF power settings of the wireless transceivers of at least one of the base, the field and the reference nodes using the geographic position of the at least one of the base and field nodes.

In another refinement, a method for monitoring a wireless process control network comprises: receiving a geographic position data from a reference node; receiving environmental data from one or more environmental field devices of the reference node; wirelessly transmitting the environmental data and the geographic position data to a base node communicatively attached to a host; interpreting the environmental data and the geographic position data at the host, sending a command from the host to the base node to adjust at least one operating parameter of the wireless network based on the environmental data and the geographic position data, and wirelessly transmitting the command from the base node to at least one field node attached to a field device.

Other advantages and features will be come apparent upon reading the following detailed description and independent claims, and upon reference to the accompanying drawings.

BRIEF DESCRIPTION OF THE DRAWINGS

For more complete understanding of this disclosure, reference should not be made to the embodiments illustrated in greater detail in the accompanying drawings and described below by way of examples. In the drawings:

FIG. 3 is a diagram of a wireless communication network within a process environment illustrating both mesh and point-to-point wireless communications;

FIG. 4 is a block diagram of a mesh and point-to-point enabled communication device that may be used to switch between mesh and point-to-point communications within the communication network of FIG. 3.

FIG. 7 is an example of a topology screen display created by a wireless network analysis tool illustrating the wireless communications within a graphic of a plant layout to enable an operator or other user to view the specific communications occurring within the wireless communication network and potential physical obstacles presented by the plant layout;

FIG. 8 is an example screen display created by a disclosed wireless network analysis tool allowing a user or operator to specify the channel routing and identification within the wireless communication network;

FIG. 14 is a table indicating a distance calculated between wireless communication devices of a wireless communications system as determined by an initialization process in accordance with this disclosure;

FIG. 17 is an example screen display presented in the tabular form of a cost matrix illustrating the number of hops or the hop count between each wireless communication device within the wireless communication system of FIG. 15;

FIG. 20 is an example of a power setting table for wireless communication devices in a wireless communication system; and FIGS. 21 and 22 are examples of a routing table for a network cluster under a first RF noise level condition and an adjusted routing table under a second RF noise level condition, respectively, where both routing tables have at most two hops between nodes.

It should be understood that the drawings are not to scale and that the embodiments are illustrated by graphic symbol, phantom lines, diagrammatic representations and fragmentary views. In certain instances, details have been omitted which are not necessary for an understanding of the disclosed embodiments and methods or which render other details difficult to perceive. This disclosure is not limited to the particular embodiments illustrated herein.

DETAILED DESCRIPTION OF PREFERRED EMBODIMENTS

Figure 1:
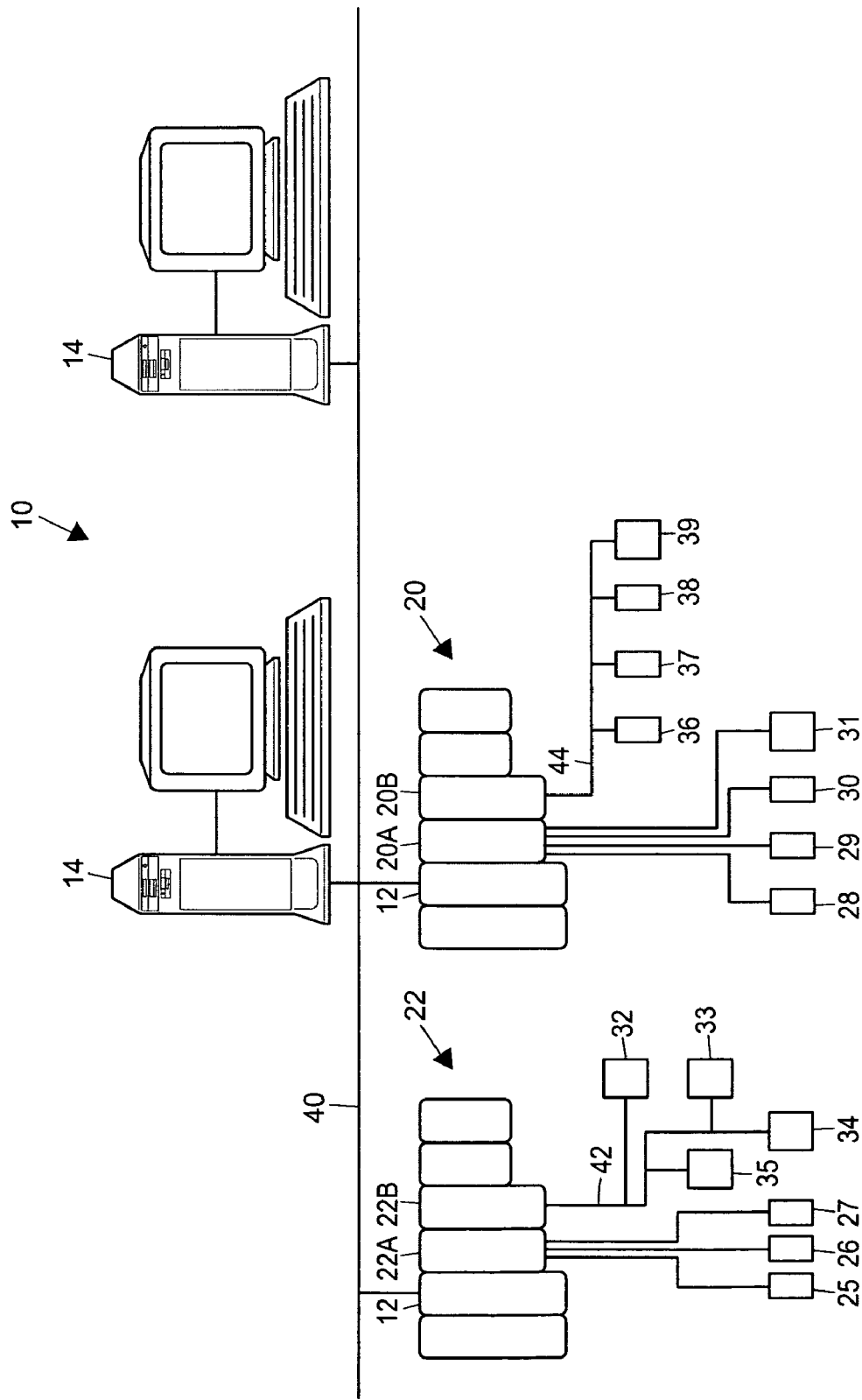
FIG. 1 is a combined block and schematic diagram of a conventional hardwired distributed control system.

FIG. 1 illustrates a typical hardwired distributed process control system 10 which includes one or more process controllers 12 connected to one or more host workstations or computers 14 (which may be any type of personal computer or workstation). The process controllers 12 are also connected to banks of input/output (I/O) devices 20, 22 each of which, in turn, is connected to one or more field devices 25-39. The controllers 12, which may be, by way of example only, DeltaV™ controllers sold by Fisher-Rosemount Systems, Inc., are communicatively connected to the host computers 14 via, for example, an Ethernet connection 40 or other communication link. Likewise, the controllers 12 are communicatively connected to the field devices 25-39 using any desired hardware and software associated with, for example, standard 4-20 mA devices and/or any smart communication protocol such as the Fieldbus or HART protocols. As is generally known, the controllers 12 implement or oversee process control routines stored therein or otherwise associated therewith and communicate with the devices 25-39 to control a process in any desired manner.

The field devices 25-39 may be any types of devices, such as sensors, valves, transmitters, positioners, etc. while the I/O cards within the banks 20 and 22 may be any types of I/O devices conforming to any desired communication or controller protocol such as HART, Fieldbus, Profibus, etc. In the embodiment illustrated in FIG. 1, the field devices 25-27 are standard 4-20 mA devices that communicate over analog lines to the I/O card 22A. The field devices 28-31 are illustrated as HART devices connected to a HART compatible I/O device 20A. Similarly, the field devices 32-39 are smart devices, such as Fieldbus field devices, that communicate over a digital bus 42 or 44 to the I/O cards 20B or 22B using, for example, Fieldbus protocol communications. Of course, the field devices 25-39 and the banks of I/O cards 20 and 22 could conform to any other desired standard(s) or protocols besides the 4-20 mA, HART or Fieldbus protocols, including any standards or protocols developed in the future.

Each of the controllers 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Groups of these function blocks are called modules. Function blocks and modules may be stored in and executed by the controller 12, which is typically the case when these function blocks are used for, or are associated with standard 4-20 mA devices and some types of smart field devices, or may be stored in and implemented by the field devices themselves, which may be the case with Fieldbus devices. While the control system 10 illustrated in FIG. 1 is described as using function block control strategy, the control strategy could also be implemented or designed using other conventions, such as ladder logic, sequential flow charts, etc. and using any desired proprietary or non-proprietary programming language.

As evident from the discussion of FIG. 1, the communications between the host workstations 14 and the controllers 12 and between the controllers 12 and the field devices 25-39 are implemented with hardwired communication connections, including one or more of HART, Fieldbus and 4-20 mA hardwired communication connections. However, as noted above, it is desirable to replace or augment the hardwired communication connections within the process environment of FIG. 1 with wireless communications in a manner that is reliable, that is easy to set up and configure, that provides an operator or other user with the ability to analyze or view the functioning capabilities of the wireless network, etc.

Figure 2:
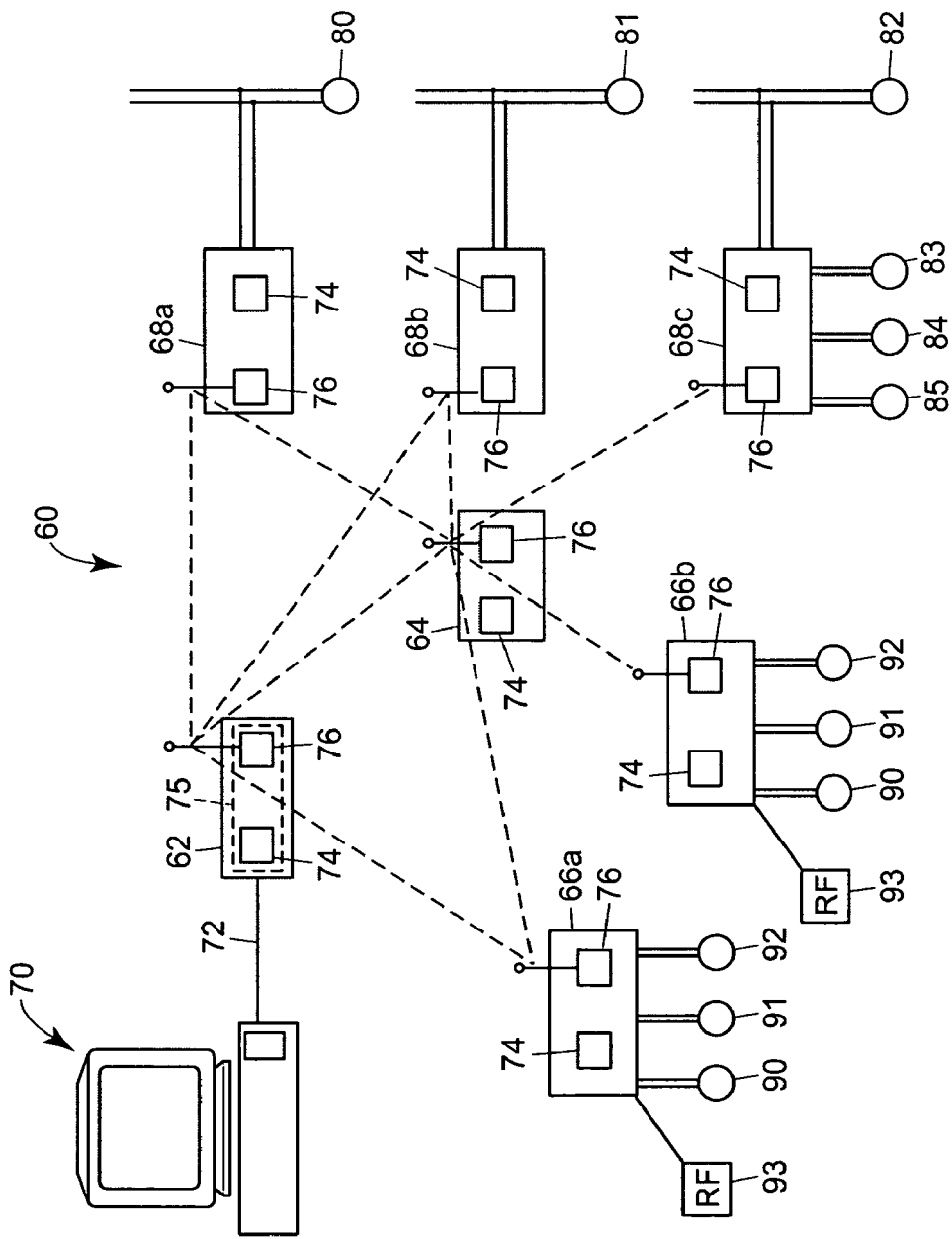
FIG. 2 is a combined block and schematic diagram of a wireless communication network within a portion of a process environment designed in accordance with this disclosure.

FIG. 2 illustrates a wireless communication network 60 that may be used to provide communications between the different devices illustrated in FIG. 1 and, in particular, between the controllers 12 (or the associated I/O devices 22) of FIG. 1 and the field devices 25-39, between the controllers 12 and the host workstations 14 or between the host workstations 14 and the field devices 25-39 of FIG. 1. However, it will be understood that the wireless communication network 60 of FIG. 2 could be used to provide communications between any other types or sets of devices within a process plant or a process environment.

The communication network 60 of FIG. 2 is illustrated as including various communication nodes including one or more base nodes 62, one or more repeater nodes 64, one or more environment nodes 66 (illustrated in FIG. 2 as nodes 66a and 66b) and one or more field nodes 68 (illustrated in FIG. 2 as nodes 68a, 68b and 68c). Generally speaking, the nodes of the wireless communication network 60 operate as a mesh type communication network, wherein each node receives a communication, determines if the communication is ultimately destined for that node and, if not, repeats or passes the communication along to any other nodes within communication range. As is known, any node in a mesh network may communicate with any other node in range to forward communications within the network, and a particular communication signal may go through multiple nodes before arriving at the desired destination.

As illustrated in FIG. 2, the base node 62 includes or is communicatively coupled to a work station or a host computer 70 which may be for example any of the hosts or workstations 14 of FIG. 1. While the base node 62 is illustrated as being linked to the workstation 70 via a hardwired Ethernet connection 72, any other communication link may be used instead. As will be described in more detail later, the base node 62 includes a wireless conversion or communication unit 74 and a wireless transceiver 76 to effect wireless communications over the network 60. In particular, the wireless conversion unit 74 takes signals from the workstation or host 70 and encodes these signals into a wireless communication signal which is then sent over the network 60 via the transmitter portion of the transceiver 76. Conversely, the wireless conversion unit 74 decodes signals received via the receiver portion of the transceiver 76 to determine if that signal is destined for the base node 62 and, if so, further decodes the signal to strip off the wireless encoding to produce the original signal generated by the sender at a different node 64, 66 or 68 within the network 60.

As will be understood, in a similar manner, each of the other communication nodes including the repeater nodes 64, the environmental nodes 66 and the field nodes 68 includes a communication unit 74 and a wireless transceiver 76 for encoding, sending and decoding signals sent via the wireless mesh network 60. While the different types of nodes 64, 66, 68 within the communication network 60 differ in some important ways, each of these nodes generally operates to receive wireless signals, decode the signal enough to determine if the signal is destined for that node (or a device connected to that node outside of the wireless communication network 60), and repeat or retransmit the signal if the signal is not destined for that node and has not previously been transmitted by that node. In this manner, signals are sent from an originating node to all the nodes within wireless communication range, each of the nodes in range which are not the destination node then retransmits the signal to all of the other nodes within range of that node, and the process continues until the signal has propagated to all of the nodes within range of at least one other node.

However, the repeater node 64 operates to simply repeat signals within the communication network 60 to thereby relay a signal from one node through the repeater node 64 to a second node 62, 66 or 68. Basically, the function of the repeater node 64 is to act as a link between two different nodes to assure that a signal is able to propagate between the two different nodes when these nodes are not or may not be within direct wireless communication range of one another. Because the repeater node 64 is not generally tied to other devices at the node, the repeater node 64 only needs to decode a received signal enough to determine if the signal is a signal that has been previously repeated by the repeater node (that is, a signal that was sent by the repeater node at a previous time and which is simply being received back at the repeater node because of the repeating function of a different node in the communication network 60). If the repeater node has not received a particular signal before, the repeater node 64 simply operates to repeat this signal by retransmitting that signal via the transceiver 74 of the repeater node 64.

On the other hand, each of the field nodes 68 is generally coupled to one or more devices within the process plant environment and, generally speaking, is coupled to one or more field devices, illustrated as field devices 80-85 in FIG. 2. The field devices 80-85 may be any type of field devices including, for example, four-wire devices, two-wire devices, HART devices, Fieldbus devices, 4-20 mA devices, smart or non-smart devices, etc. For the sake of illustration, the field devices 80-85 of FIG. 2 are illustrated as HART field devices, conforming to the HART communication protocol. Of course, the devices 80-85 may be any type of device, such as a sensor/transmitter device, a valve, a switch, etc. Additionally, the devices 80-85 may be other than traditional field devices such as controllers. I/O devices, work stations, or any other types of devices.

In any event, the field node 68a, 68b, 68c includes signal lines attached to their respective field devices 80-85 to receive communications from and to send communications to the field devices 80-85. Of course, these signal lines may be connected directly to the devices 80-85, in this example, a HART device, or to the standard HART communication lines already attached to the field devices 80-85. If desired, the field devices 80-85 may be connected to other devices, such as I/O devices 20A or 22A of FIG. 1, or to any other desired devices via hardwired communication lines in addition to being connected to the field nodes 68a, 68b, 68c. Additionally, as illustrated in FIG. 2, any particular field node 68a, 68b, 68c may be connected to a plurality of field devices (as illustrated with respect to the field node 68c, which is connected to four different field devices 82-85) and each field node 68a, 68b, 68c operates to relay signals to and from the field devices 80-85 to which it is connected.

In order to assist in the management in the operation of the communication network 60, the environmental nodes 66 are used. In this case, the environmental nodes 66a and 66b include or are communicatively connected to devices or sensors 90-92 that measure environmental parameters, such as the humidity, temperature, barometric pressure, rainfall, or any other environmental parameters which may affect the wireless communications occurring within the communication network 60. As discussed in more detail below, this information may be useful in analyzing and predicting problems within the communication network, as many disruptions in wireless communications are at least partially attributable to environmental conditions. If desired, the environmental sensors 90-92 may be any kind of sensor and may include, for example, HART sensors/transmitters, 4-20 mA sensors or on board sensors of any design or configuration. Of course, each environmental node 66a, 66b may include one or more environmental sensors 90-92 and different environmental nodes may include the same or different types or kinds of environmental sensors if so desired. Likewise, if desired, one or more of the nodes 66a, 66b may include an electromagnetic ambient noise measurement device 93 to measure the ambient electromagnetic noise level, especially at the wavelengths used by the communication network 60 to transmit signals. Of course, if a spectrum other than the RF spectrum is used by the communication network 60, a different type of noise measurement device may be included in one or more of the environmental nodes 66. Still further, while the environmental nodes 66 of FIG. 2 are described as including environmental measurement devices or sensors 90-93, any of the other nodes 68 could include those measurement devices so that an analysis tool may be able to determine the environmental conditions at each node when analyzing the operation of the communication network 60.

Using the communication system 60 of FIG. 2, an application running on the workstation 70 can send packets of data to and receive packets of wireless data from the wireless conversion unit in the form of the wireless base card 74 residing in a standard controller 75 at the base node 62. This controller 75 may be, for example, a DeltaV controller and the communications may be the same as with a standard I/O card via the Ethernet connection to the DeltaV controller. The I/O card in this case includes the wireless base card 74, though as far as the controller and PC Application goes, it appears as a standard HART I/O card.

In this case, the wireless card 74 at the base node 62 encodes the data packet for wireless transmission and the transceiver 76 at the base node 62 transmits the signal. FIG. 2 illustrates that the transmitted signal may go directly to some of the field nodes such as nodes 68a and 68b, but may also propagate to other field nodes, such as node 68c, via the repeater node 64. In the same manner, signals created at and propagated by the field nodes 68 may go directly to the base node 62 and other field nodes 68 or may be transmitted through other nodes such as the repeater node 64 or another field node before being transmitted to the base node 62. Thus, the communication path over the wireless network 60 may or may not go through a repeater node 64 and, in any particular case, may go through numerous nodes before arriving at the destination node. If a sending node is in direct communication reach of the base unit 62, then it will exchange data directly. Whether or not the packets pass through a repeater node 64 is completely transparent to the end user, or even to the card firmware.

It will be noted that FIG. 2 is a schematic diagram and the placement of the environmental nodes 66a, 66b relative to the field nodes 68a-68c are not intended to be relative to their actual placement in an actual process control area. Rather, the environmental nodes 66a, 66b (and other environmental nodes not pictured or a single environmental node) are intended to be placed about the process control area in a logical and strategic manner as shown in FIG. 7. In other words, environmental nodes 66 should be placed at spaced apart location, such as at opposing ends of large obstacles or pieces of equipment or near roadways where interference from moving vehicles may be present. Also, environmental nodes should be placed both indoors and outdoors if applicable. The network of environmental nodes 66 is intended to be used by the base node 62 and host 70 as a means for monitoring the operation of the wireless network 60 and modifying the operation of the network 60 by increasing or decreasing signal strength, gain, frequency etc.

It will be noted that the field nodes 68 are placed at or near various process stations. The field nodes 68 may be important safety devices or may be used to monitor and/or control various processes. Further, more than one repeater node 64 may be used and, in fact, FIG. 2 is but one example as it may be determined that only a single environmental node 66 is necessary, that more than one or no repeater nodes 64 are needed and that fewer than three or more than three field nodes 68 are necessary.

Turning to FIGS. 3 and 4, it is anticipated that the wireless network 60 of FIG. 2 may need to be switched back and forth between mesh and point-to-point communication modes. FIG. 3 illustrates a network 100 with a base node 101 in communication with repeater nodes 102a, 102b, 102c. The repeater nodes 102a-102c are, in turn, in communication with a plurality or a cluster of either environmental nodes, field nodes or combination of the two as shown generally at 104. A point-to-point wireless communication system for FIG. 3 is shown in solid line while an alternative mesh configuration is shown in phantom line.

Turning to FIG. 4, a switch device 105 is shown schematically which may be disposed in the base node 101 in addition to the wireless transceiver 76. The switch 105 is intended to convert the network 100 from a mesh wireless network as shown by the phantom lines in FIG. 3 to a point-to-point wireless network as shown by way of example in the solid line of FIG. 3. Of course, the point-to-point communications can be configured in any manner and the solid lines shown in FIG. 3 are but one example. The switch device 105 as shown in FIG. 4 can include an electronic switch element 106 that shifts the device 105 between a mesh wireless transceiver 76a and a point-to-point wireless transceiver 76b.

Figures 5, 6:
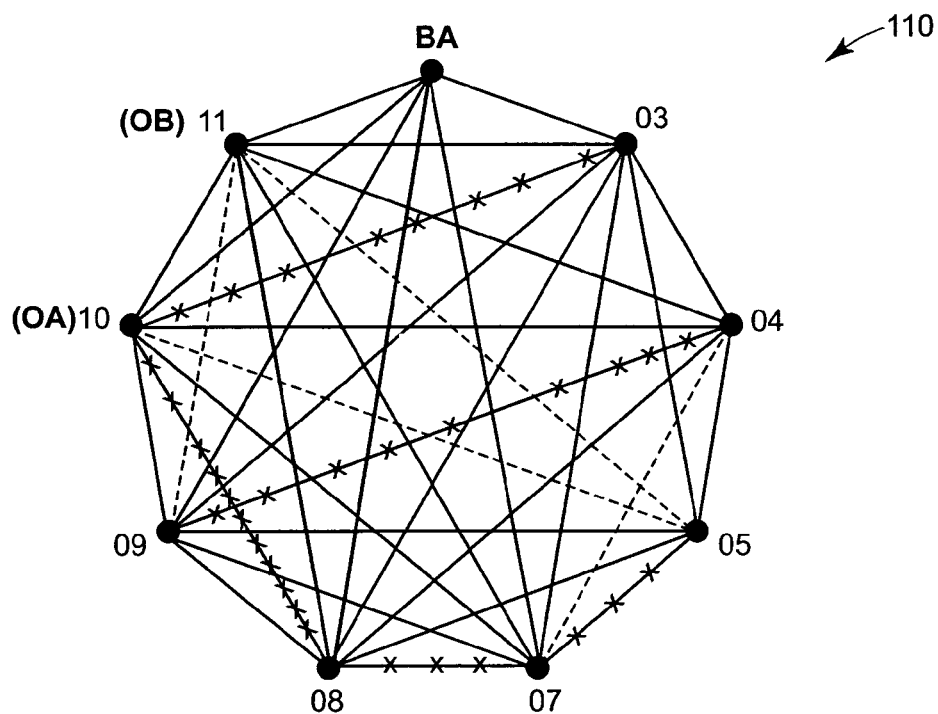
FIG. 5 is an example of a geometric topology screen display created by a wireless network analysis tool illustrating the wireless communications between different devices within the wireless communication system designed in accordance with this disclosure.
FIG. 6 is an example screen display presented in tabular form and created by a wireless network analysis tool illustrating the number of hops or the hop count between each of the wireless communication devices within a disclosed wireless communication system.

As noted above, the disclosed network 60 includes a base node 62 and host 70 that may be programmed to provide a variety of graphical interfaces that will be useful to the operator. Examples of such graphical interfaces are shown in FIGS. 5-9. Turning to FIG. 5, a geometric topology screen display 110 is disclosed which illustrates a wireless network between a base node BA and a plurality of other nodes which may be one or more repeater nodes, field nodes and environmental nodes numbered in FIG. 5 as 03, 04, 05, 07, 08, 09, 10 (0A), and 11 (0B). The topology display 110 of FIG. 5 illustrates a successful communication between two nodes with a solid line, one example of which is the communication between the base node BA and the node 7. A successful communication in one direction only is illustrated by a line with cross hatches, one example of which is the line between the nodes 03 and 10 (0A). An unsuccessful communication is indicated by a dashed or phantom line, one example of which is the lack of communication illustrated by the dashed line between nodes 05 and 11 (0B). FIG. 5 also illustrates the "hop count" between nodes. For example, looking at nodes 04 and 07, the dashed or phantom line between nodes 04 and 07 of FIG. 5 make it clear that there is no direct wireless communication between nodes 04 and 07 while there is communication between nodes 04 and 05 and one-way communication between nodes 05 and 07. Thus, for one-way communication between nodes 04 and 07, there is a hop count of 2 (node 04 to node 05 and node 05 to node 07). Alternatively, for two-way communication between nodes 04 and 07, there is also a hop count of 2 (node 07 to node 03 and node 03 to node 04). Obviously, the lower the hop count the better and the more reliable the communication.

The hop counts for the network shown in FIG. 5 are shown in tabular form in FIG. 6. The nodes labeled 10 and 11 in FIG. 5 are also indicated as 0A and 0B in FIG. 6. The base node BA communicates directly with nodes 03 through 0B and therefore the hop count between the base node BA and any one of 03 through 0B is one as indicated in the top row of the table shown in FIG. 6. Turning to the second row of the table of FIG. 6, it will be noted that the hop count between node 03 and any of the other nodes is also 1 as node 03 of FIG. 5 includes no dashed lines emanating from it. However, turning to the third row of the table of FIG. 6 and referring to FIG. 5, it will be noted that node 04 includes a dashed line extended between node 04 and node 07 and therefore direct communication between node 04 and node 07 is not possible. Thus, to connect from node 04 to node 07, the communication proceeds through node 05 for a hop count of 2. Still further, because there is a cross-hatched line between node 04 and node 09 in FIG. 5, direct two-way communication between node 04 and 09 is not possible. Accordingly, for two-way communication between nodes 04 and 09, the communication must pass through node 08 as indicated in the table of FIG. 6. All of the entries that are circled in FIG. 6 indicate a hop count of 2.

Turning to FIG. 7, a topology map similar to that shown in FIG. 5 is illustrated as an overlay of a map for an actual process environment. Specifically, each point is the location of 1 of the 9 nodes show in FIG. 5 and listed in the table of FIG. 6. FIG. 7 provides the operator with an opportunity to view the wireless connectivities within the context of the actual operating environment. Global positioning system reference points are indicated at 111, 112 so actual distances between the nodes can be determined.

Turning to FIG. 8, the field devices 80-85 and 90-93 may appear to the base node 62 or host 70 as a standard HART device. This enables standard applications such as AMS software to run seamlessly on top of the wireless network 60. To utilize the AMS software, the wireless field nodes 66 and 68 need to know how to route messages. This is accomplished by utilizing a routing map 120 as illustrated in FIG. 8. This map 120 is stored in the nonvolatile memory of the base unit 62, but also could be stored in the memory of the host 70. The actual routing takes advantage of incorporating a base card that is identical to an 8 channel HART card. The routing tool then maps 8 virtual HART channels to remote field nodes and their channels. FIG. 8 illustrates a mapping configuration for 8 different devices. Each Field type wireless node may include 4 different HART channels, though the field device will have one unique ID. The actual target channel is embedded in the wireless packet. Each ID for each wireless unit is based on 2 bytes. The first byte is the network number and correlates to an actual radio channel in the wireless interface. The number of the first byte can range from 1 to 12. The second byte is the identification of the node in the network and can range from 1 to 15. When a node is initialized for a first time, its default address is 010F, which means network 1, address 15. The exception to this address scheme is the base unit which always has BA as its first byte, the second byte representing which network the device is in.

Figure 9:
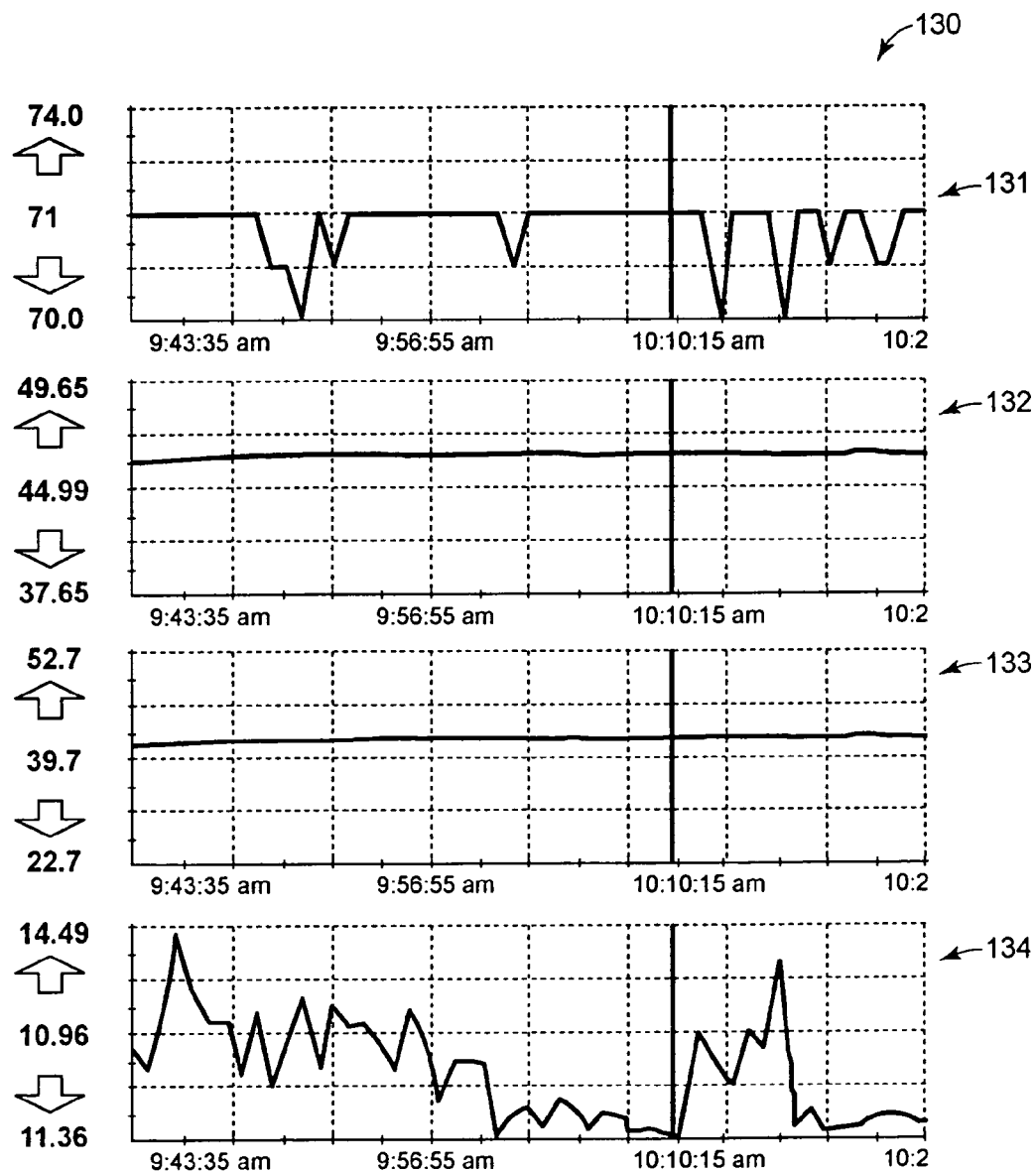
FIG. 9 is an example screen display created by a wireless network analysis tool illustrating graphical displays of information about the wireless communications between different devices within the wireless communication system to enable a user or operator to analyze the operational capabilities and parameters of the wireless communication network.

Turning to FIG. 9, another graphical presentation 130 for display at the host 70 (FIG. 1) is shown. 4 graphs are shown, one on top of each other with time being plotted on the x-axes. The top graph 131 plots a total hop count for the entire system which, as shown, averages about 72 or slightly less. An increase in the hop count would provide a warning to the operator. The other graphs in FIG. 9 provide environmental information from the environmental node 66 shown in FIG. 2. The graph 132 provides a reading of barometric pressure; the graph 133 provides a reading of humidity; and the graph 134 provides a reading of the general RF background noise within the operating frequency band. Other environmental indications not presented in FIG. 9 could be temperature and rainfall.

Figure 10:
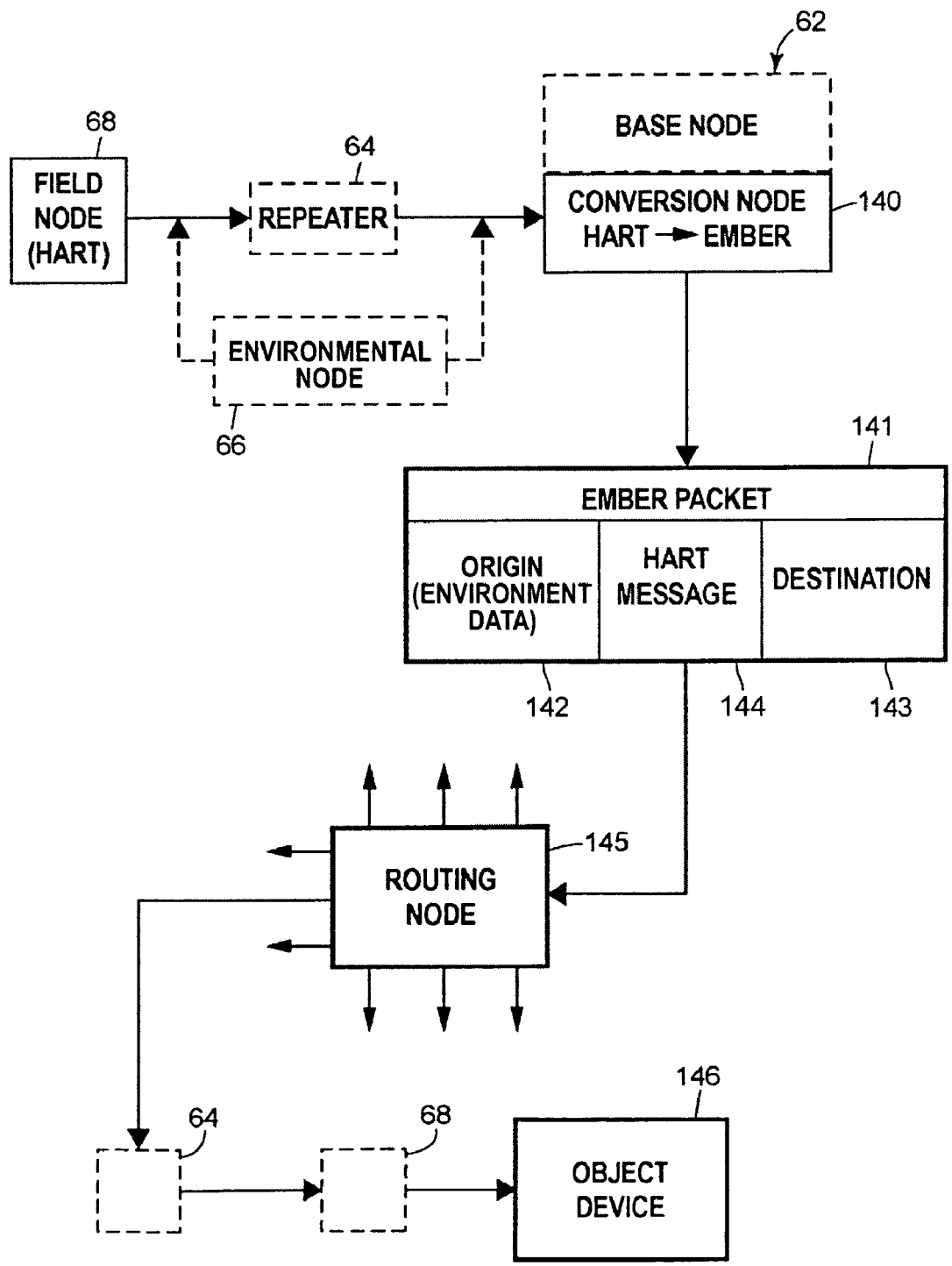
FIG. 10 is a block diagram of a wireless communication device that implements a HART communication protocol wirelessly using a second communication protocol, e.g. the EMBER® protocol.

Turning to FIG. 10, it will be noted that many of the devices 80-85 shown in FIG. 2 would be HART field devices, and therefore the field node 68 will be sending a HART signal to either a repeater node 64 or directly to a conversion node 140 which, in the embodiment shown in FIG. 10, may be a separate element or may comprise part of the base node 62. A HART signal may also be sent from an environmental node 66 as shown. The conversion node 140 includes software to convert the HART signal to a different protocol, e.g., the EMBER protocol used with low-power wireless networking software and radio technology. See http://www.ember.com/. Of course, other protocols are available and will be apparent to those skilled in the art. The conversion node 140 converts the HART signal to an EMBER data packet at 141. The data packet includes an origin indication 142 and a destination indication 143 which is determined by software either in the base node 62 or in the conversion node 140. The HART message 144 is sandwiched between the origin data 142 and destination data 143. The signal is then sent to a routing node 145 which determines, from the destination information 143, which object device 146 to send the data to. The routing node 145 then transmits the data through one or more repeaters 64 and/or field nodes 68 to the object device 146. One type of software that could be used to convert the field device signal from one protocol (HART) to another protocol is the JTS software sold by Acugen (http://www.acugen.com/jts.htm).

Generally speaking process control environments are less dynamic regarding initial installation and permanent location of field devices such as smart valves, etc. Therefore, it may be possible to determine an initial configuration of wireless nodes attached to field devices based on the initial location of the field devices, where such node configurations can be downloaded to the wireless nodes. Because most of the wireless nodes available in the market support a number of different configuration settings, including pathway routing tables and transmission power level settings, the initial configuration setting may be updated over time based on revised locations, changes in RF noise signatures over time, or other environmental determinant factors.

Figure 11:
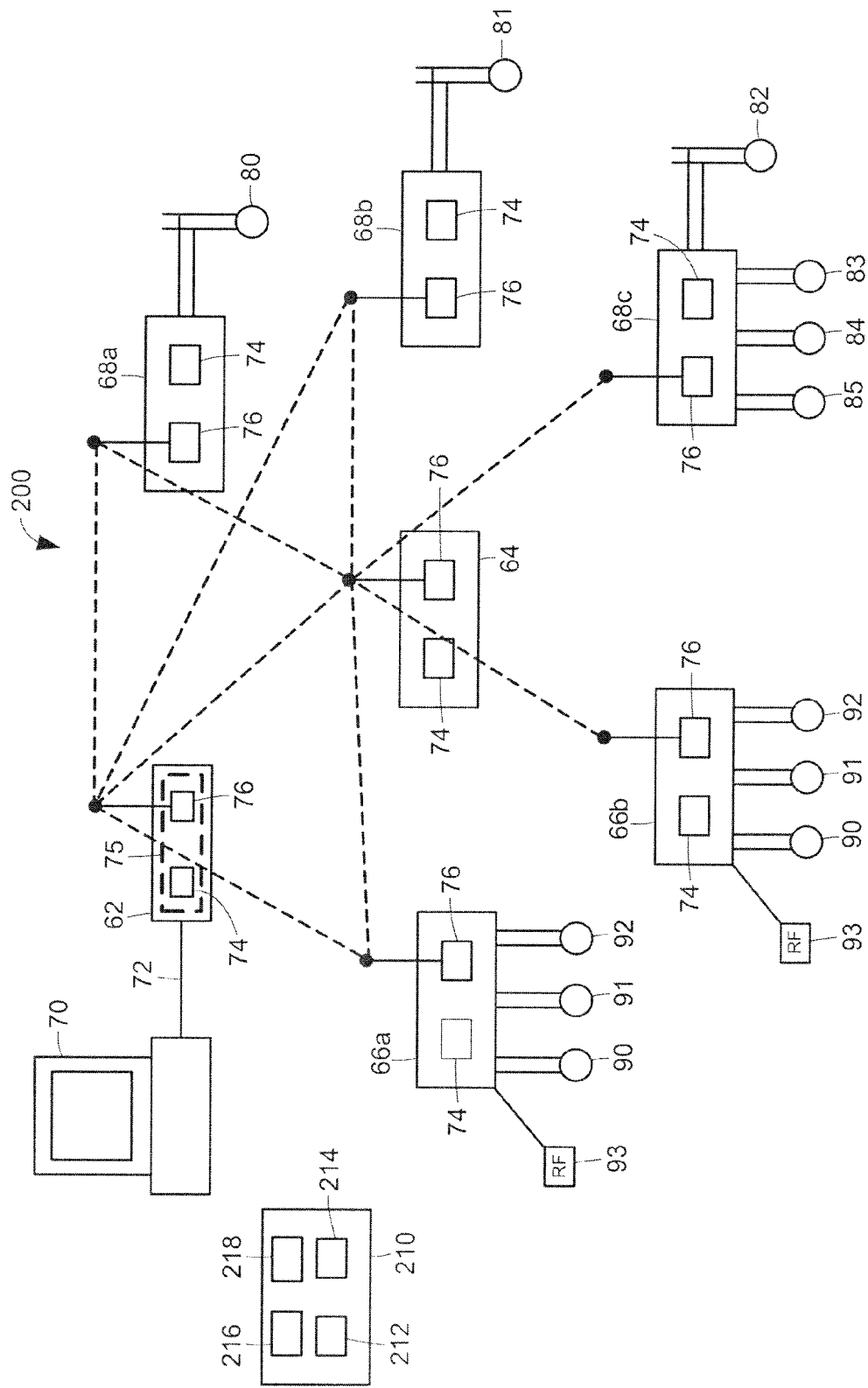
FIG. 11 is a combined block and schematic diagram of a wireless communication network within a portion of a process environment designed in accordance with this disclosure.

An alternate embodiment of the communication network 60 that utilizes the information regarding the locations of various wireless nodes to determine configuration settings of the wireless nodes and of the network is illustrated in FIG. 11. Specifically, FIG. 11 illustrates a modified wireless communication network 200 (with components similar to those of network 60 bearing the same reference numbers) that includes a reference node 210 including a geographic positioning apparatus that may be used to determine geographic position of the reference node 210 with respect to a plurality of other nodes. The communication network 200 may also include one or more base nodes 62, one or more repeater nodes 64, one or more environment nodes 66 (illustrated in FIG. 11 as 66*a* and 66*b*) and one or more field nodes 68 (illustrated in FIG. 2 as nodes 68*a*, 68*b* and 68*c*). The functioning of these nodes is described in further detail in FIG. 2 above.

The reference node 210 may be a portable node, e.g., a handheld device, capable of being located at various positions in the wireless communication network 200. The reference node 210 may include a transceiver 212 that may be used to communicate with one or more of the various wireless nodes located in the communication network 200 and a geographic positioning system (GPS) transceiver 214 that may be used to communicate with a satellite providing geographic positioning signal to the reference node 210. A geographic positioning apparatus 214 on the reference node 210 may be used to determine the location of the reference node 210 and one or more of the other communication nodes in the communication network 200. A power setting apparatus 216 on the reference node 210 may be used to determine configuration settings of the one or more of the other communication nodes in the network 200.

Note that while in the illustrated embodiment of the communication network 200 the geographic positioning apparatus 214 and the power setting apparatus 216 are located on the reference node 210, in an alternate embodiment, the geographic positioning apparatus 214 and the power setting apparatus 216 may be located at some alternate location on communication network 200, such as at any of the other nodes such as the base node 62 for the host 70, the repeater node 64 or any of the other nodes 66, 68, etc. It may be advantageous to locate the geographic positioning apparatus 214 and the power setting apparatus 216 in the reference node 214 as the reference node 210 may be a portable node that may be easily replaced or updated with newer software, etc.

The geographic positioning apparatus 214 may be implemented by a GPS program stored on the memory of the reference node 210. Such a GPS program may be activated every time the location of the reference node 210 is changed. Alternatively, such a GPS program may register with a GPS satellite at every predetermined interval to determine the coordinates of the reference node 210. In some examples, the reference node 210 may also provide manual control for overriding automatic GPS registration. Further upon establishing a communication link with other nodes, the GPS program of the reference node 210 may be remotely controlled to set the conditions, frequency, etc. for registering with a GPS satellite. This control may also include, for example, synchronizing reference node registration with other nodes or synchronizing reference node registration with processes existing in a processing environment.

The power setting apparatus 216 may be implemented by a program stored on the memory of the reference node 210. The power setting apparatus 216 may be capable of determining the geographic position of the reference node 210 based on the GPS signal from the geographic positioning apparatus 214. Further, the power setting apparatus 216 is coupled to receive a signal from a sensor apparatus 218 of the reference node 210. The sensor apparatus 218 may be an RF noise measurement apparatus, for example, capable of measuring RF noise levels at the reference node 210. In the example of an RF noise measurement apparatus, in response to the data from the sensing apparatus 218, the power settings apparatus 216 may determine RF power settings of the reference node, base node, and/or field node to counteract changes in the RF noise level. Such information may be recorded in a power settings table, or other form in the memory, and then communicated to each of the nodes (base, field, reference, etc.) of the network 200 for setting power policy.

In some examples, the power setting apparatus 216 is adapted to measure and record the distance of the reference node 210 to other nodes. The distance may be derived from the GPS data of the geographic positioning apparatus 214. The power setting apparatus 216 may determine an optimal location for the reference node, base node, field nodes, etc. based on the RF noise levels measured at each of a plurality of locations and the distances between nodes.

The power setting apparatus 216 may also provide the functionality of a network configuration switch, such as the switch device 105. For example, based on measured RF noise levels at a plurality of locations and distances between locations, the power setting apparatus 216 may determine whether the nodes of the network 200 should operate as a mesh communication network or a point-to-point communication network.

The RF noise measurement apparatus 218 may be programmed to determine RF noise levels over a period of time that may be preset or adjusted during operation. The power setting apparatus 216 may be programmed to adjust the power settings of the transceivers of the nodes of the network based on the RF noise level data gathered over time. For example, power settings for each node may be adjusted throughout the day, or over a weekend, etc. to compensate for actual or predicted changes in RF noise level. That is, in some examples, the RF noise measurement apparatus 218 may be adapted to produce an RF noise predictive function based on previously recorded RF noise level data. The predictive function may for example predict increases in RF levels that occur each day at sun rise. With expanding the RF data collection window to longer periods of time, the predictive function may further predict when each day that sun rise is expected, as that time changes throughout the year. Of course, this is an example, the predictive function may be programmed to predict RF level based any number of parameters that can be correlated to changes in measured RF levels. Predictive values may be based on any unit of time measure, e.g., time of day, day or week, day of month, etc.

In some examples, predictive values may be based on a time value that is synchronized to or triggered by a particular event, such as a time value based on a clock that starts with a particular processing operation. In a processing environment, for example, certain events like a unit shutdown or turnaround may alter RF noise level patterns in predictive ways, but the timing for these changes would be correlated to (and thus based on) the timing of the event and not necessarily correlated to a particular time of day, week, month, etc.

Although RF noise is discussed in the examples, the measurement apparatus 218 may include a plurality of sensor devices, such as those of an environmental node as described above, including a sensors of temperature, barometric pressure, humidity, and rainfall, or the measurement apparatus 218 may include any one of these sensor devices. Data from such sensors may be used in setting power levels for the transmitters at various nodes in the network, e.g., based on the measurement of RF frequency ambient noise. In some examples, the sensor data may be used to set the routing tables for the wireless communication system, thus establishing the cluster of nodes and routing paths from the nodes in the wireless communication system. Of course, the data from the sensors may be used for decisional control unrelated to RF frequency measurement.

Figure 12:
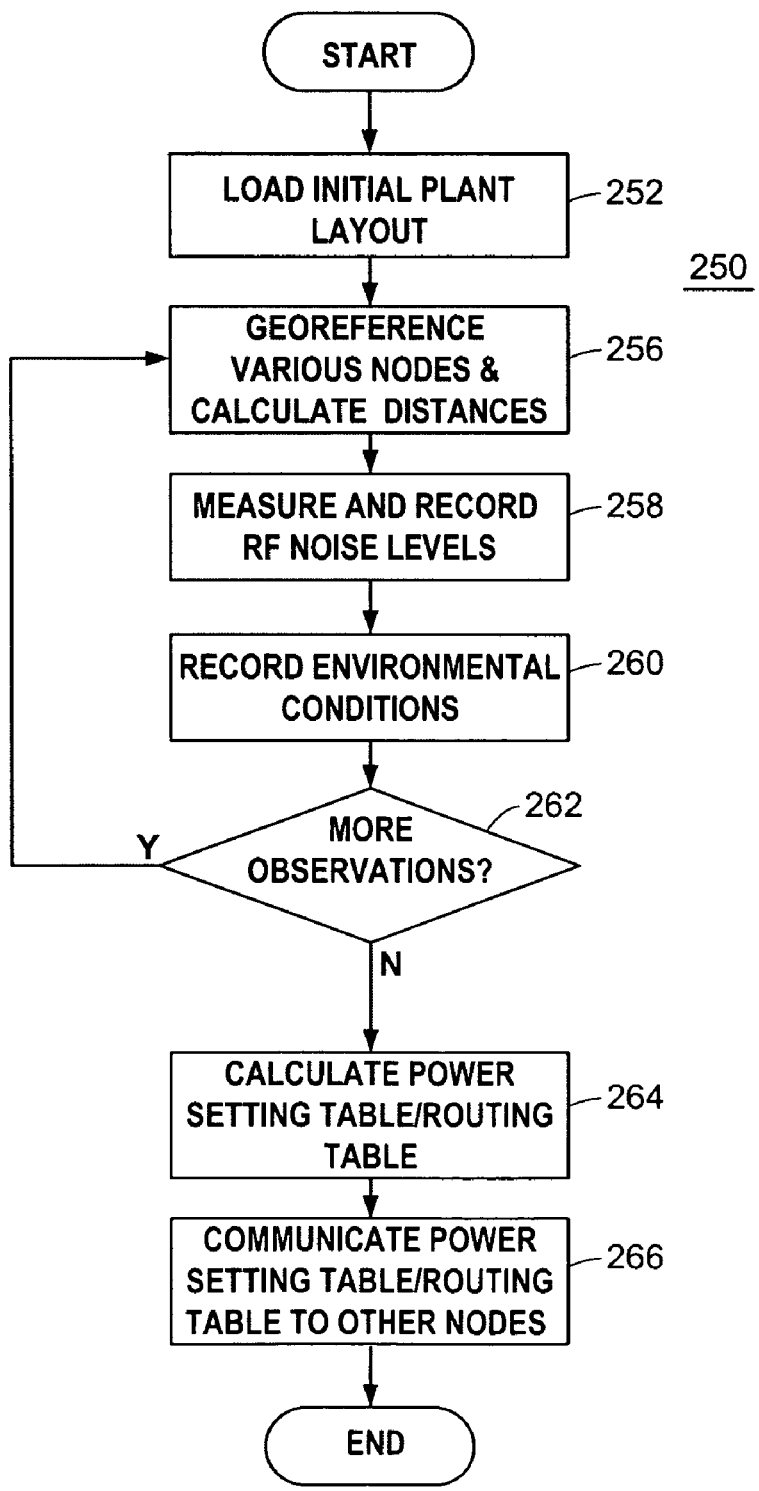
FIG. 12 is a block diagram of a process for initializing a wireless communication system formed of a cluster of wireless communication devices having a routing table and a power setting table.

FIG. 12 illustrates a flowchart of a power setting program 250 to determine power setting of the various transceivers used in the network 200. As with the apparatuses 212-218, the power setting program 250 may be implemented on any node of the network 200. In an implementation, the power setting program 250 may be implemented on the power setting apparatus 216 in conjunction with GPS transceiver 214 and the sensor apparatus 218 located on the reference node 210. For explanation purposes, the program 250 will be explained in reference to FIGS. 13-17.

Figure 13:
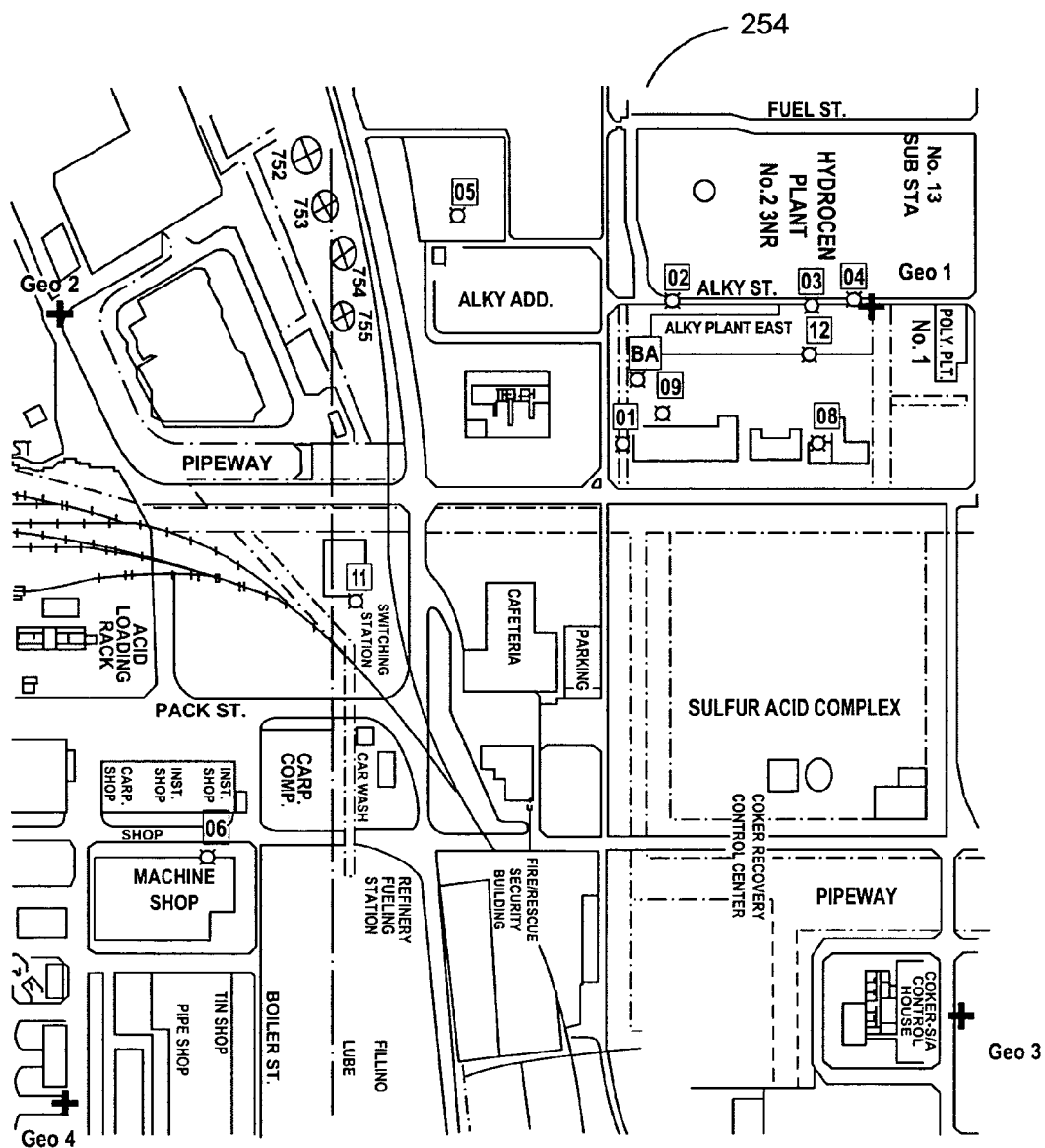
FIG. 13 is an example of a screen display illustrating a process environment layout with wireless communication devices forming a wireless communication system in accordance with this disclosure.

A block 252 performs initial loading of a plant layout map that identifies the different processing locations, units, etc. within the plant. FIG. 13 shows an example plant layout map 254 with various locations labeled. The block 252 then binds the plant layout map to a GPS coordinate system defined by a series of GPS reference points, marked by Geo2, Geo2, Geo3, and Geo4, that have known or measurable longitude, latitude, and altitude coordinates. As shown in FIG. 13, these GPS reference points may set the boundaries within which a reference node may be placed for measuring optimal positions for nodes on a network, RF noise levels, and distances between nodes.

With the layout data loaded and the GPS coordinates defined, a block 256 begins georeferencing various reference nodes, such as the nodes labeled BA, 01, 02, 03, 04, 05, 06, 08, 09, BA, 11, and 12. The block 256 may register one node at a time with the GPS satellite through the GPS transceiver. The block 256 may compare the GPS data received from the GPS satellite to stored data from other nodes to determine a distance between the present position of the reference node and the remaining other nodes in the network. Alternatively, the distance between nodes may be determined based on measured signal strength from other nodes and the inverse square law. For example, each node may be programmed to periodically transmit node specific identifiers, either through the use of an encoded node identifier information on the transmitted signal, through different nodes being allotted different time windows to transmit, or through other techniques. The transceiver 212 may receive a signal and identify the source node, e.g., though decoding or time division identification, and measure signal strength from which the distance between the reference node 210 and the transmitting mode may be determined.

FIG. 14 illustrates a tabular form that may be produced from program 250 and which lists the distances between nodes on a network.

Once registered, a block 258 may measure RF noise levels at the reference node 210, recording that data locally at the reference node 210 and/or transmitting that data for centralized recording at a host machine, such as machine 70.

If the reference node includes environmental condition sensors, block 260 measures and records those conditions. As with the other functional control units illustrated within the example reference node 210 of FIG. 12, the environmental sensor may be located exterior to the reference node, for example, at an environmental node within the network. From here, a block 262 determines if additional reference node observations are to be measured, in which case the program 250 returns to block 256. If the block 256 is programmed to measure georeference only one node at a time, the block 262 can determine if any remaining nodes (e.g., nodes BA or 01-12 of FIG. 13) must be georeferenced. If no additional observations are needed, the program 250 passes control to block 264.

Block 264 determines a power setting table based on the data measured at blocks 256-260 to develop a power settings for the nodes on the network. The block 264 may develop those power settings based on actual RF noise levels or RF noise predictive functions, determined at the block 264 from the data of block 258. The block 264 may also determine the network configuration type, for example mesh communication network or point-to-point configuration network.

The block 264 may execute a power setting algorithm that selectively adjusts output power at each node, collectively or individually, while measuring the effect on network operation. For example, the block 264 may cycle output power at the nodes while simultaneously measuring the resulting total node count and total hop count for the network. These total values may be compared to total values measured at other power settings to determine an optimum power setting given an acceptable network coverage area and minimal total hop count. Particular regions with a plant layout may be of higher priority than others, so the comparisons at different power settings may be weighted as desired. A power setting table is created from these comparisons. Prior to, during, or after power setting, the block 264 may determine the routing table, reflecting a desired network path for the wireless communications network. The above are example descriptions of the instructions that may be executed by the block 264. The block 264 may be implemented using other algorithms and techniques to form or modify the power setting table and routing table.

These determinations from the block 264 are communicated to the nodes of the network by block 266. For example, if environmental conditions are measured by a measurement apparatus on a remote node, such as the reference node 210 or environmental node 66, then a power settings apparatus at a centralized controller station, such as a base node, may calculate a power setting table for all the nodes, thus identifying power levels and power level changes across a given time window. After initialization of the network via program 250, the centralized controller, through block 266, may communicate the calculated power setting table to each of the nodes for local storage and power control.

In the illustrated example, the block 264 may be capable of calculating a routing table in addition to the power setting table. The routing table pathway defines a network cluster from among the georeferenced nodes and more specifically the possible paths from each node to each other node. A controller may identify and set a network configuration (e.g., mesh or point-to-point communication) for a cluster of nodes based on the measured RF noise levels or other environmental data, power settings, and measured distances between nodes, whether that configuration is identified through a routing table. The block 266 may communicate the calculated routing table to each of the nodes for local storage and use in wireless communications.

Figure 15:
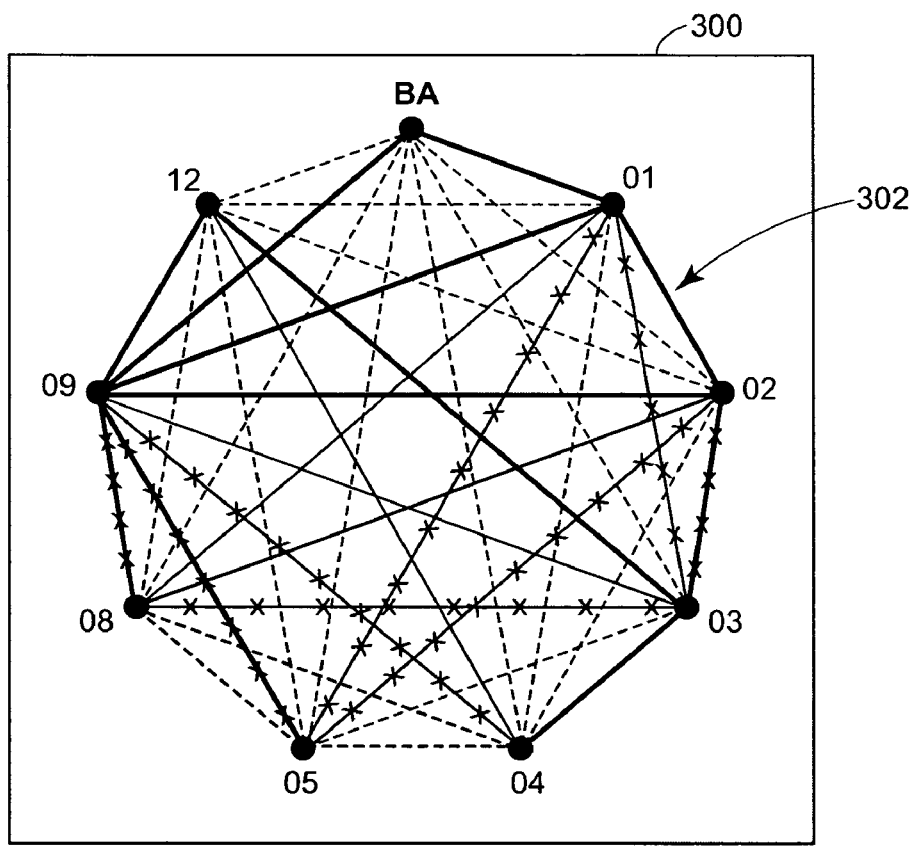
FIG. 15 is an example of a geometric topology screen display created by the process of FIG. 12.
Figure 16:
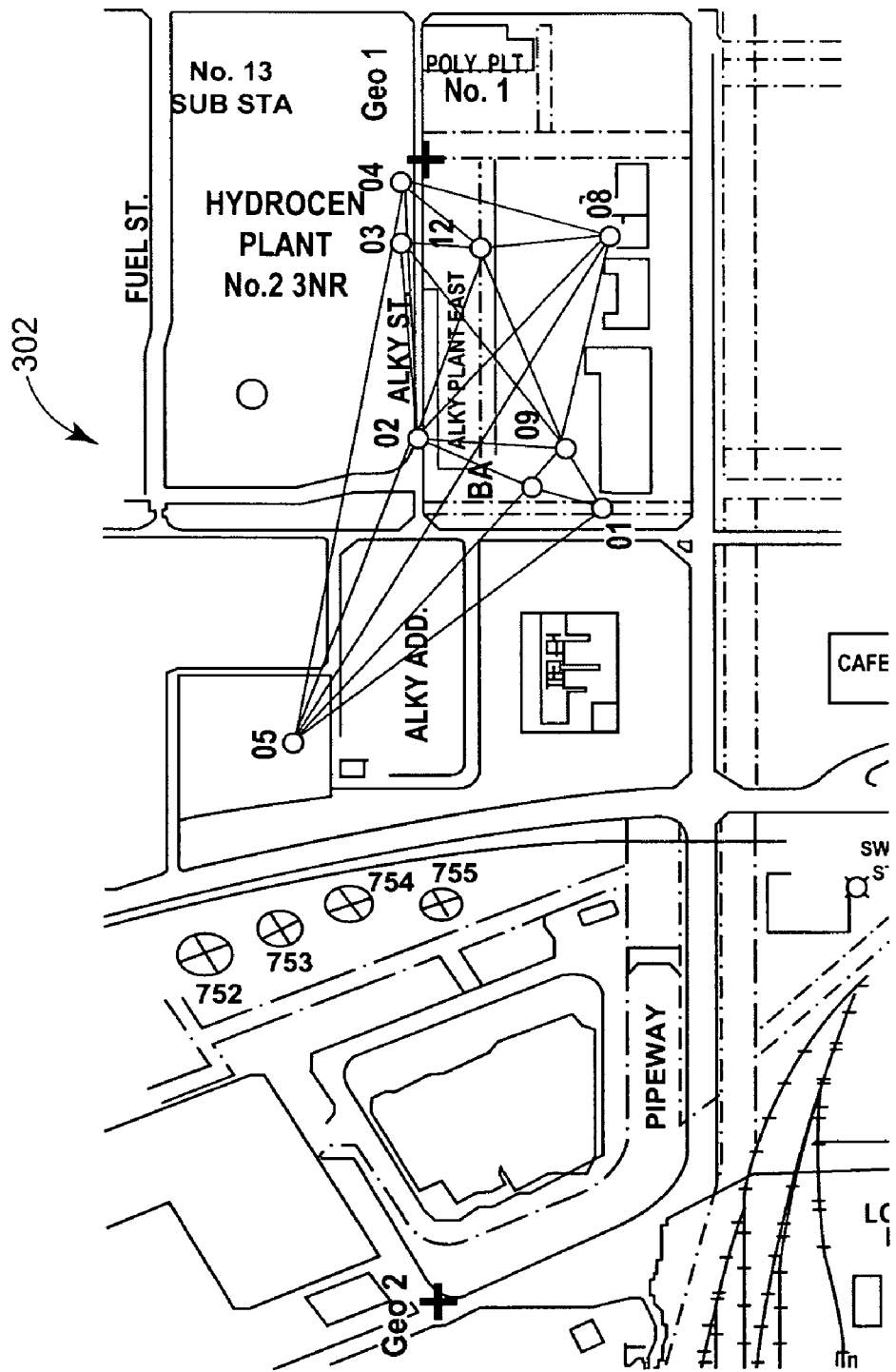
FIG. 16 is an example of a topology screen display illustrating the wireless communications within a graphic of a plant layout, and showing a wireless communication system formed in the layout of FIG. 13 and having node paths as set forth in FIG. 15, but for clarity reasons not showing the differences in paths, path directionality, and path strength between the nodes as shown in FIG. 15.

FIG. 15 provides a geometric topology screen display 300 of a network cluster defined for the plant layout map 254. After georeferencing each of the nodes as shown in FIG. 13, the block 264 in defining the power settings and routing table, identifies a cluster 302 (shown in FIG. 16) portion of the plant layout map 254 for forming a communication network. In the illustrated example, that cluster 302 is formed of the nodes BA, 01, 02, 03, 04, 05, 08, 09, and 12 and in a mesh communication network. Nodes 06 and 11 have been excluded from the network by the block 264, for example due to being capable of sending or receiving a signal to at least one of the nodes forming the mesh cluster 302. In the convention of FIG. 15, the thick dark solid line represents a strong 2-way direct connection between nodes (e.g., between nodes 04 and 03); the think dark solid line with a cross hatch represents a weak 2-way direct connection between nodes (e.g., between nodes 09 and 05); the thinner dark solid line represents a 1-way direct, strong connection between nodes (e.g., one way between nodes 12 and 04); the thinner dark solid line with cross hatches represents a weak 1-way direct connection (e.g., one way between nodes 01 and 03); and the dashed or phantom line represents a poor or unsuccessful direct communication between nodes (e.g., between nodes 05 and 04).

The cluster 302 may be characterized by a topology cost matrix that identifies the number of hops a signal will have to make between any two nodes of the cluster. FIG. 17 shows a cost matrix 400 for the cluster 302. The matrix 400 shows the possible node connections with the nodes listed across a row 402 and a column 404. Within the table are numbers reflecting the number of hops determined for each connection between two nodes, where the column 404 indicates the transmitting node and the row 402 represents the receiving node. For example, a signal transmitted from node 08 and received at node 12 will require 4 hops, which can be determined by going to indictor 08 in column 404 and indicator 12 in row 402, where a value 406 indicates that 4 hops are necessary in the illustrated cost matrix 400. It is noted that given any two nodes, the transmission path may be different than the receive path. The characteristics of a propagation pattern may be unique to the local environment. As a result, pathways between two nodes may be different depending upon the source of the transmission.

Depending on the strength of the signal and the presence of one-way communication paths, the number of nodes for the converse path, i.e., with the receiving and transmitting nodes reversed, may be different. In the matrix 400, for example, a signal transmitted from node 12 to node 08 would experience 2 hops, as indicated by going to node 12 in column 404 and node 08 in row 402 where a value 408 shows 2 hops.

Generally, the fewer the number of hops the stronger the connection and the less likely there will be signal loss, bit failure, etc. However, within many environments the signal strength between nodes will vary, from strong to weak, such that even a single direct path between two nodes may not reflect the ideal path due if much stronger multiple hop paths exists. It depends on the preference settings of the reference node or base node that establishes the routing table and power settings table.

This cost matrix 400 is based on one particular set of values from a corresponding routing table. The same cluster of nodes 302 may have a different routing table and thus a different cost matrix. That is, any given number of node pairs may have numerous different connection possibilities, and matrix 400 represents just one.

Further, the wireless mesh network may be adjusted, for example, in response to environmental settings, such as RF noise. In response to actual or predicted changes in the RF noise level, routing tables at the nodes may be re-adjusted to establish different pathways to different nodes on the network. Another adjustment technique is through adjusting the power settings for the transceivers at the remote node to compensate for the changes in RF noise, whether those changes reflect RF noise increases which would suggest increased transmitter power levels for the affected nodes or RF noise decreases which would suggest decreased transmitter power levels for the affected nodes. In predictive systems in particular, the network may maintain integrity by re-routing those pathways affected by the RF noise or adjusting the power setting, without time out or down time.

Figure 18:
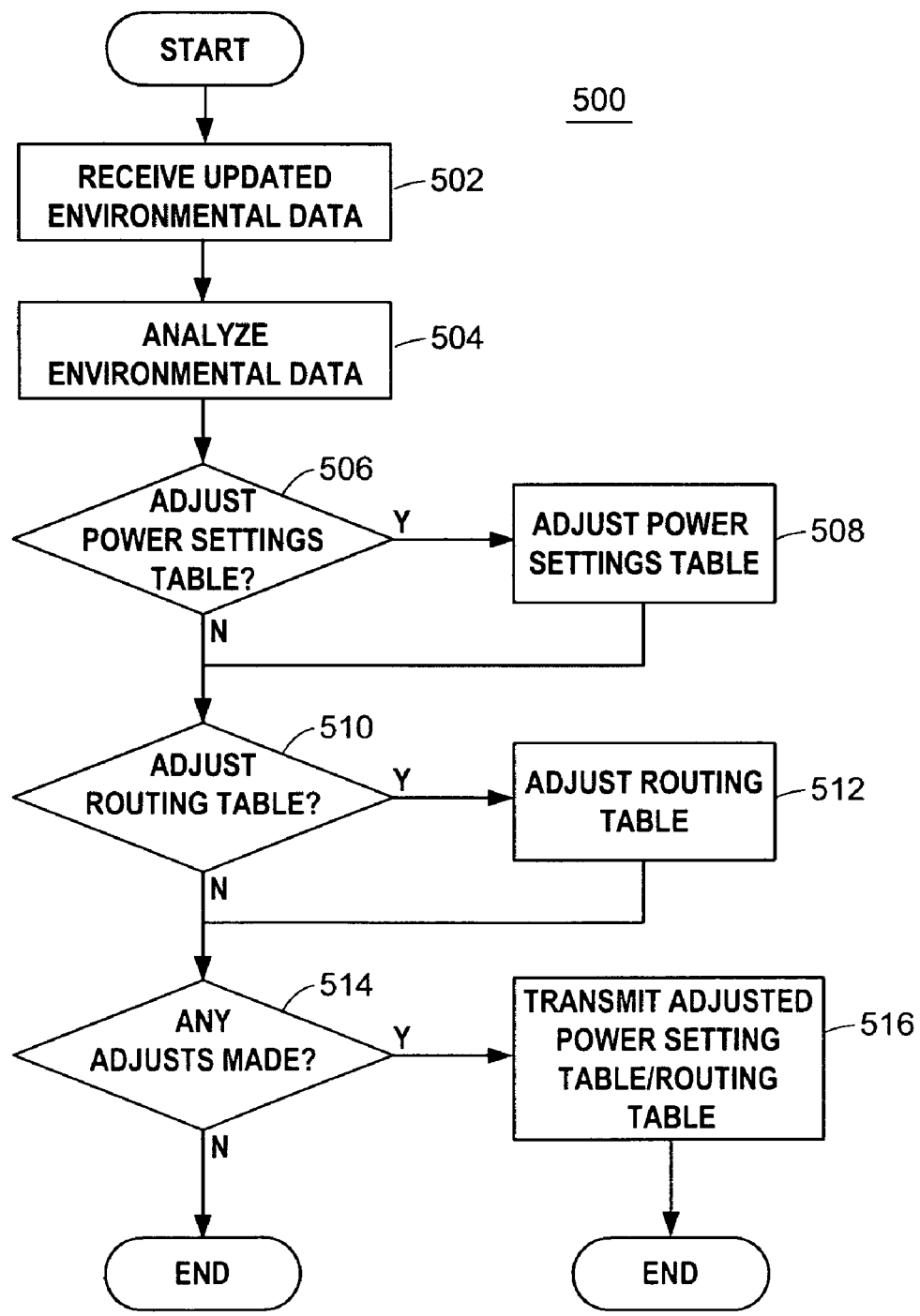
FIG. 18 is a block diagram of a process for adjusting the power setting table or routing table in response to changes in measured environmental conditions in accordance with this disclosure.

Adjustment of the routing table may be based on empirical data developed during operation, for example, through an RF noise measurement apparatus at the reference or other nodes constantly measuring for changes in RF noise levels. Whereas program 250 may reflect an initialization sequence, program 500 shown in FIG. 18 may be used to adjust the power settings and/or rotating tables in response to changes in the RF noise level during operation. With the plant layout and all geofer-enced nodes identified, along with a cluster forming a mesh or point-to-point network, a reference node or base node may receive RF noise update data from nodes in the system. The update data, for example, may include the measured environment data from a measurement apparatus such as that described above. In examples with a centralized controller like a base node, remote nodes may be programmed to constantly or periodically update the host computer with such data. Alternatively, the remote nodes may be programmed to communicate only upon charges in the environmental data, e.g., when the RF noise changes by a certain threshold value. In examples where a reference node or other remote node operates as the control node for adjusting RF power settings and routing tables for the network, the other remote nodes communicate with the power setting apparatus at this remote control node.

In any event, the centralized or distributed controller receives environmental data from each remote node at block 502. Along with environmental data, the remote nodes may transmit actual power levels, time, and other data. In some examples, the controller would already have access to the desired power levels for comparison to actual power levels, e.g., when the controller also set the initial power settings for the wireless communication system. Further, the controller and remote nodes should be synchronized, such that if time information is sent that information may be used for synchronization confirmation and correction purposes. At block 504, the controller analyzes the update data from the remote nodes to determine a predictive function of when similar changes will occur again. For RF noise update data, the block 504 may compare the update data to historical RF noise data to determine if a pattern exists, such as an increase in RF noise at sunrise of each morning.

The block 504 produces a predictive function and provides that function to a block 506, for example, a power setting apparatus as described above, which determines whether the predictive function should be used to adjust the power settings table. For example, the block 506 may determine that the change in RF noise level may be compensated for through increasing or decreasing the RF power settings at the affected remote units. Block 508 performs the adjustments to the power setting table. A block 510 similarly determines if the predictive function is such that the routing table itself should be adjusted, and a block 512 performs the adjustments to the routing table. In the illustrated example, the program 500 may be set to adjust both the RF power setting table and the routing table. A block 514 determines whether an adjustment has been made, and a block 516 transmits the adjusted data or the program 500 ends.

The adjustment procedures just discussed may be achieved on a centralized control node or they may be achieved at one or more remote nodes in a distributed manner. That is, the initial routing table and power settings may be centrally determined by a host computer at the base station, which may wirelessly communicate data to each node, while adjustment (including re-optimization) of the routing table and/or power settings may be performed at this central location or elsewhere in the wireless communication system.

In some examples, the base node may communicate multiple routing tables and power settings to the other nodes for local storage and access. The base node, for example, may transmit a primary routing table that is to be used under normal conditions and secondary and tertiary routing tables for non-normal conditions. For example, the base node may communicate a secondary routing table to be used upon generator turn on, and which routing table is initiated in response to instruction from the base node.

Figure 19:
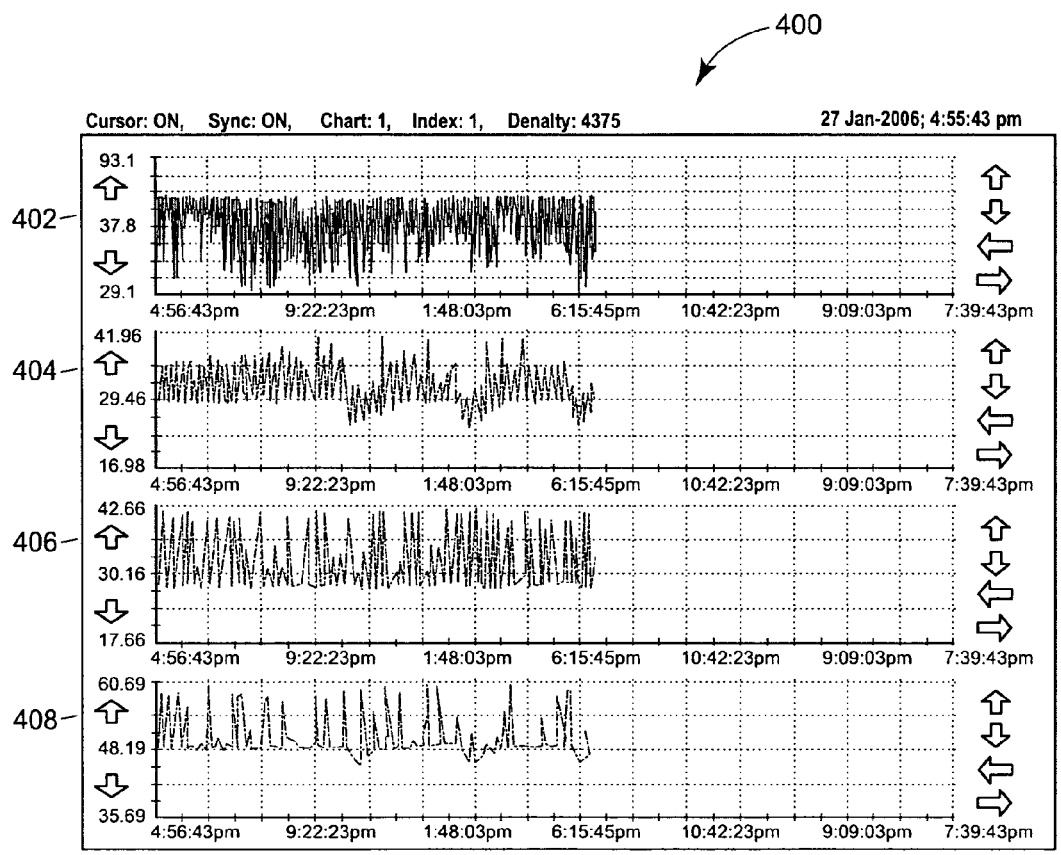
FIG. 19 is an example screen display illustrating graphical displays of information about the wireless communications system, including the connectivity and the RF noise level at various wireless communication devices.

FIG. 19 is an example screen display 400 created by a wireless network analysis tool and illustrating RF ambient noise levels for various nodes. The graph portion provides four graphs one on top of another, each measured across time on the horizontal axis. The top graph 402 plots connectivity over time, as a percentage of the overall cost. The connectivity may for example reflect the cost, measured in total hops, for a network cluster as a function of time. The remaining graphs plot RF noise levels at different nodes, or unit locations in the plant layout map 254. Graph 404 plots the RF noise level measured at the node 09; graph 406 plots the RF noise level measured at the node 08; and graph 408 plots the RF noise level measured at the node 12. As can be seen, the highest RF noise level spikes are present at unit 12 (60.69 cost value as a highest plotted value). While RF noise is plotted in the illustrated example, other environmental data may be displayed instead.

An example power setting table 600 with arbitrary units in power and set as a function of time for each node is shown in FIG. 20. For illustration purposes, the table 600 includes time slots 602 that are the result of changes in the power settings. A full table may include time slots formed in repeating units of time, e.g., each 30, 15, 10, 5, or 1 minute in length. The changes in power settings are the result of analysis from a power setting apparatus and based on RF noise data collected over time. The base station node BA, for example, is predicted as seeing an RF noise level increase around 5:30 am—an arbitrary time for sunrise—which results in a power setting 604 of 40 for 12:00 am to 5:30 am changing to higher power setting 606 of 60 for 5:30 am to 6:30 am. In the illustrated example, the RF noise level at node BA peaks within this time window, for example, as employees initially arrive to a unit and increase the overall RF noise level. Over the next time window, power setting 608 for node BA is ramped down to 55, reflecting a predicted smaller drop in RF noise levels. Other changes and differences in power settings for the different nodes are apparent from the table. These power settings may represent optimal setting values, meaning that the overall minimum number of hops are used throughout the network at the minimum power settings.

FIGS. 21 and 22 illustrate example routing tables for a node cluster containing 2 or fewer hops, similar to the illustration of FIG. 6. FIG. 21 illustrates a first routing table 700 under a first set of RF noise levels. All routes listed are single hop count routes with the exception of entries 702-712 which reflect two hops between nodes in one direction, with the transmitting node on the vertical axis and the receiving node on the horizontal axis. FIG. 22 illustrates that same routing table, labeled 700', after it has been adjusted in response to RF noise levels. The two-hop entries 702, 704, and 708 have not changed, but the remaining two-hop entries, now 706', 710', and 712', have now changed to reflect a different routing path as a result of measured or predicted RF noise level changes at the remote nodes.

Although the present invention has been described with reference to preferred embodiments, workers skilled in the art will recognize that changes may be made in form and detail without departing from the spirit and scope of the invention.

What is claimed is:

1. A wireless communication network, comprising:
a base node, a field node, a reference node and a host;
the base node communicatively coupled to the host;
the base, field and reference nodes each comprising a wireless conversion unit and a wireless transceiver;
the wireless transceivers of the base, the field and the reference nodes effecting wireless communications amongst the base, field and reference nodes;
the field node comprising at least one field device providing process control data;
the reference node comprising a geographical positioning apparatus to determine geographical position of the reference node;
an RF noise measurement apparatus located on at least one of the base, field and reference nodes, wherein the RF noise measurement apparatus is to determine RF ambient noise levels at the RF noise measurement apparatus over a predetermined time period; and
a power settings apparatus located on at least one of the base and reference nodes, wherein the power setting apparatus is to
determine the geographic position of each of the base and field nodes relative to the reference node, and
determine RF power settings of the wireless transceivers of at least one of the base, the field and the reference nodes using the geographic position of the at least one of the base and field nodes and using the RF ambient noise levels determined by the RF noise measurement apparatus.

2. The wireless communication network of claim 1, wherein the reference node is implemented using a handheld device.

3. The wireless communication network of claim 1, wherein the RF noise measurement apparatus is further to generate an RF ambient noise predictive function predicting the RF ambient noise level as a function of at least one of: (1) time of day, (2) day of week, and (3) day of month.

4. The wireless communication network of claim 3, wherein the power settings apparatus is further to adjust RF power settings of the wireless transceivers of at least one of the base, the field and the reference nodes using the RF ambient noise predictive function.

5. The wireless communication network of claim 1, wherein:
the RF noise measurement apparatus is to measure RF ambient noise levels at a plurality of locations of the reference node;
the power setting apparatus is to measure and record the distance of the reference node at each of the plurality of locations from at least one of the base and field nodes; and
the power setting apparatus determines an optimal location for the reference node based on the RF ambient noise levels at the plurality of locations and distance between the reference node at each of the plurality of locations and at least one of the base and field nodes.

6. The wireless communication network of claim 5, wherein the power setting apparatus is further to determine geographic location of at least one of the base and field nodes based on the RF ambient noise levels at the plurality of locations and the distance between the reference node at each of the plurality of locations and the at least one of the base and field nodes.

7. The wireless communication network of claim 1 further comprising a repeater node comprising a wireless conversion unit and a wireless transceiver, the repeater node effecting wireless communications amongst the base, field and environmental nodes.

8. The wireless communication network of claim 1 wherein the reference node further comprises a plurality of sensor devices, each of the plurality of sensor devices providing data selected from a group consisting of temperature, barometric pressure, humidity, rainfall and radio frequency ambient noise.

9. The wireless communication network of claim 1 wherein the at least one field device of the field node comprises at least one of a HART protocol device and a Fieldbus™ protocol device.

10. The wireless communication network of claim 1 further comprising a plurality of environmental nodes strategically placed about a process area for communicating environmental data for different locations within the process area.

11. The wireless communication network of claim 1 wherein the base, environmental and field nodes form at least one of a mesh communications network and a point-to-point communications network.

12. The wireless communication network of claim 11, wherein the power setting apparatus is further to determine a network configuration based on the RF ambient noise levels at a plurality of locations and the distance of the reference node at each of the plurality of locations from at least one of the base and field nodes.

13. The wireless communication network of claim 12, further comprising a switch device to convert the base, environmental and field nodes from a mesh communications network to a point-to-point communications network and vice versa.

14. The wireless communication network of claim 1, wherein the host comprises a monitor, the host being programmed to provide a topology screen display on the monitor illustrating wireless communications between each of the base, field and reference nodes of the network.

15. The wireless communication network of claim 14, wherein the topology screen display also illustrates structural features of a process area in which the base, field and environmental nodes are disposed.

16. The wireless communication network of claim 14, wherein the topology screen display also illustrates strength of RF reception at some of the base node, the reference node and the field node.

17. The wireless communication network of claim 1, wherein the host comprises a monitor, the host being programmed to provide a tabular screen display on the monitor listing a hop count between each of the field and environmental nodes and the base node of the network.

18. The wireless communication network of claim 1, wherein the power settings apparatus is to adjust a routing table of the base, the field and the reference nodes using the RF ambient noise levels.

19. A method for monitoring a wireless process control network, the method comprising:
receiving a geographic position data from a reference node;
receiving data indicative of a radio frequency (RF) ambient noise level from one or more environmental field devices of the reference node;
wirelessly transmitting the data indicative of the RF ambient noise level and the geographic position data to a base node communicatively attached to a host;
interpreting the data indicative of the RF ambient noise level and the geographic position data at the host,
sending a command from the host to the base node to adjust at least one operating parameter of the wireless network based on the data indicative of the RF ambient noise level and the geographic position data, and
wirelessly transmitting the command from the base node to at least one field node attached to a field device.

20. The method of claim 19, further comprising receiving, from the one or more environmental field devices, data selected from a group consisting of temperature, barometric pressure, humidity, and rainfall.

21. The method of claim 20, wherein the geographic position data further includes geographic position of at least one of the base node, the reference node and the field node.

22. The method of claim 21, wherein the data indicative of the RF ambient noise level includes data indicative of RF ambient noise levels at the reference node over a pre-determined period of time.

23. The method of claim 19, wherein the operating parameter is an RF power setting for each of the at least one field node.

24. The method of claim 19, wherein the operating parameter is a routing table for the wireless network.

* * * * *

UNITED STATES PATENT AND TRADEMARK OFFICE
CERTIFICATE OF CORRECTION

| | | |
|---|---|---|
| PATENT NO. | : 8,160,574 B1 | Page 1 of 1 |
| APPLICATION NO. | : 11/644758 | |
| DATED | : April 17, 2012 | |
| INVENTOR(S) | : Joe Nelson | |

It is certified that error appears in the above-identified patent and that said Letters Patent is hereby corrected as shown below:

<u>In the Specification:</u>

At Column 8, line 25, "be come" should be -- become --.

At Column 13, line 35, "goes" should be -- go --.

At Column 21, lines 60-61, "geoferenced" should be -- georeferenced --.

Signed and Sealed this
Twenty-ninth Day of April, 2014

Michelle K. Lee
*Deputy Director of the United States Patent and Trademark Office*